United States Patent [19]
Yatsukawa

[11] Patent Number: 6,148,404
[45] Date of Patent: Nov. 14, 2000

[54] AUTHENTICATION SYSTEM USING AUTHENTICATION INFORMATION VALID ONE-TIME

[75] Inventor: Naonobu Yatsukawa, Tokyo, Japan

[73] Assignee: Nihon Unisys, Ltd., Tokyo, Japan

[21] Appl. No.: 09/084,497

[22] Filed: May 27, 1998

[30] Foreign Application Priority Data

May 28, 1997  [JP]  Japan ................................. 9-138724

[51] Int. Cl.[7] .............................. G06F 11/00; H04L 9/00
[52] U.S. Cl. ............................................. 713/200; 380/30
[58] Field of Search ................................... 713/200, 201, 713/202; 380/1–3, 4, 23, 24, 25, 28, 29, 30, 42, 43, 44, 45, 286, 258, 259; 364/286.4, 286.5, 286.6; 340/825.34, 825.31

[56] References Cited

U.S. PATENT DOCUMENTS

| | | | |
|---|---|---|---|
| 5,153,919 | 10/1992 | Reeds, III et al. | 380/44 |
| 5,204,902 | 4/1993 | Reeds, III et al. | 380/23 |
| 5,365,589 | 11/1994 | Gutowitz | 380/43 |
| 5,406,628 | 4/1995 | Beller et al. | 380/30 |
| 5,475,758 | 12/1995 | Kikuchi | 380/25 |
| 5,491,752 | 2/1996 | Kaufman et al. | 380/30 |
| 5,497,421 | 3/1996 | Kaufman et al. | 380/23 |
| 5,604,801 | 2/1997 | Dolan et al. | 380/21 |
| 5,724,425 | 3/1998 | Chang et al. | 380/25 |
| 5,737,419 | 4/1998 | Ganesan | 380/21 |
| 5,748,735 | 5/1998 | Ganesan | 380/21 |
| 5,850,442 | 12/1998 | Muftic | 380/21 |
| 5,922,074 | 7/1999 | Richard et al. | 713/200 |
| 5,953,422 | 9/1999 | Angelo et al. | 380/23 |

*Primary Examiner*—Nadeem Iqbal
*Attorney, Agent, or Firm*—Burns, Doane, Swecker & Mathis, LLP

[57] ABSTRACT

An authentication method adopting simple steps, in which it is difficult for a third person, who steals authentication data, to reuse (to replay, for attacking purpose) the stolen authentication data. First inspection data (value=$D_{n-1}$), used for inspecting client's authentication data, is stored in a server in advance, while the client also stores first seed data (value=$D_{n-1}$) for generating authentication data. The client first sends an authentication request to the server, and receives an authentication data request from the server. Then the client generates authentication data (value=$D_n$) by enciphering the first seed data (value=$D_{n-1}$) using a client's secret key ($K_s$), and sends the enciphered data to the server. The server deciphers the received authentication data (value=$D_n$) by using a public key ($K_p$) of the client to generate second inspection data (value=$D_{n-1}$), compares the second inspection data with the first inspection data (value=$D_{n-1}$), and when they are coincident, grants the authentication request and stores the authentication data (value=$D_n$) in place of the first inspection data. Upon receiving the grant, the client stores the authentication data (value=$D_n$) as second seed data in place of the first seed data (value=$D_{n-1}$).

23 Claims, 16 Drawing Sheets

SERVER TICKET : SERVER-USE GRANTED
AUTHENTICATOR : CERTIFICATE OF USER AUTHENTICITY

FIG. 10

NOTE ○: MASQUERADING POSSIBLE
△: MASQUERADING PARTLY POSSIBLE
×: MASQUERADING IMPOSSIBLE

| SCHEME | THREATS / AUTHENTICATION SCHEME | UNAUTHORIZED INTRUDER WHO "MASQUERADE" | | NOTE |
|---|---|---|---|---|
| | | EXTERNAL THIRD PERSON | SERVER ADMINISTRATOR | |
| I USING KNOWLEDGE | CONVENTIONAL PASSWORD SCHEME | ○ | ○ | EASILY WIRETAPPED, RE-USING POSSIBLE |
| | ONE-TIME PASSWORD SCHEME | × | △ | CANNOT REUSE WIRETAPPED CONTENTS, BUT WHEN PASSWORDS ARE USED UP, RE-REGISTRATION NECESSARY |
| | CHALLENGE-RESPONSE SCHEME | × | ○ | VULNERABLE TO DICTIONARY ATTACK WHEN SERVER IS INTRUDED |
| II USING CIPHER | DIGITAL SIGNATURE SCHEME | △ | ○ | RE-USING STOLEN AUTHENTICATION DATA POSSIBLE |
| | AUTHENTICATION TOKEN SCHEME WITH DIGITAL SIGNATURE | △ | × | RE-USING STOLEN AUTHENTICATION DATA POSSIBLE IN A PREDETERMINED TIME PERIOD |
| | SSH (SECURE SHELL) SCHEME | △ | × | id |
| | RPC AUTHENTICATION SCHEME | △ | ○ | id |
| | KERBEROS SCHEME | △ | ○ | id ; IF CENTRAL AUTHENTICATION SERVER IS INTRUDED, THE DOMAIN WILL BE DESTROYED |
| | ZERO-KNOWLEDGE PROOFS AND INTERACTIVE PROOFS SCHEME | × | × | INTERACTIVE SEQUENCE REDUNDANT AUTHENTICATION PROCESS COMPLICATED |
| III USING BIO-LOGICAL CHARAC-TERISTICS | FINGERPRINT, VOICE SPECTRUM, HAND PRINT, RETINA PATTERN, SIGNATURE, HANDWRITING, KEYSTROKE | △ | ○ | HIGH SECURITY FOR OFF-LINE (LOCAL) AUTHENTICATION, BUT IN AUTHENTICATING OVER NETWORK, RE-USING BY WIRETAPPING POSSIBLE. SAME LEVEL OF SECURITY AS I AND II |
| IV USING POSSESSION | KEY, TOKEN, BADGE, ELECTRONIC KEY, MAGNETIC CARD, IC CARD, NON-CONTACT TYPE CARD | △ | ○ | id |

| IDENTIFICATION NAME | INSPECTION DATA | PUBLIC KEY |
|---|---|---|
| X | $D_x = D_0$ | $K_{px}$ |
| W | $D_w = D_0$ | $K_{pn}$ |
| ⋮ | ⋮ | ⋮ |

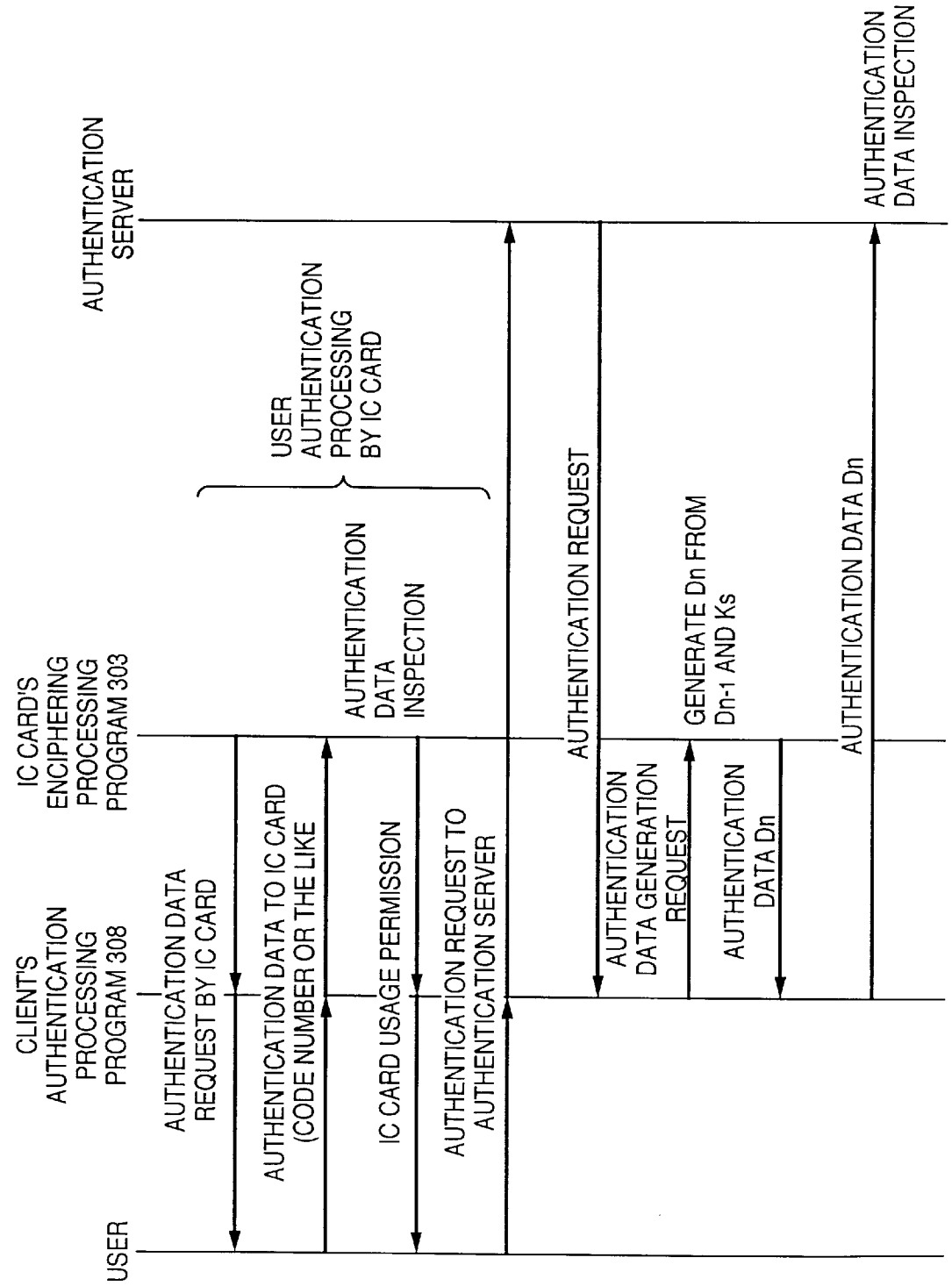

AUTHENTICATION SYSTEM USING AUTHENTICATION INFORMATION VALID ONE-TIME

BACKGROUND OF THE INVENTION

The present invention relates to an authentication method and system using authentication information valid for one-time. The invention also relates to an authentication apparatus and an authentication server serving as an authenticator in the authentication processing.

As data processing systems play a main role in various aspects of social activities in recent years, there is an urgent problem of security protection in data communication among individuals or between individuals and business entities via network.

Particularly, considering the fact that a recent network system is publicly open and widely used, security function is indispensable in the field such as electronic commerce or confidential-data transfer. For instance, in a case where legal action is taken between business entities or between individuals, conventionally (or even now), a contract or the like is written on a physical document, signed, impressed with a seal, and if necessary, accompanied with a registration certificate of seal impression or a notary certificate by notary officials, and the document is mailed to the other party by registered mail or contents-certified mail.

Technology in electronic data communication that safely substitutes the above action taken mostly on physical documents, is the network security technology. Today, as the data communication network using computers and networks spans worldwide, the demands for the network security technology are steadily increasing.

The purpose of the network security consists in assuring security of a network, that is, protecting data from various threats according to the level of confidentiality of the network system. In general, the purpose is to maintain ① confidentiality, ② integrity, ③ availability and ④ non-repudiation. Meanwhile, typical threats to the network that may be assumed to happen are wiretapping, leakage, masquerading, tampering/forgery, unauthorized intrusion/ unauthorized access, interception, repudiation of facts, destruction and so on.

The essential techniques for network security are security technology, authentication technology, technology for transferring keys, technology for non-repudiation, a third-party credit agency, access control technology, security inspection, security evaluation standard and so on.

When data communication is performed via a network system, it is important, also necessary, to verify, control and manage who has used the system and how the system has been used, in order to maintain security. Most events occurred in the system are caused by a particular entity related to data communication; therefore, awareness of such fact is the basics for security assurance.

Authentication is to verify whether or not an entity (human being, or processes, software, hardware, communication data or the like which function in place of a human being) participating in data communication is the true (authentic) entity. In general, authentication can be classified as shown in FIG. 1, depending on the entity to be authenticated.

Entity authentication is to verify authenticity of an entity related to data communication e.g., a sender/receiver of a message or the like, while message authentication is to verify authenticity of a sent/received message. Note that entity authentication is sometimes called user authentication.

An entity authentication mechanism can be classified into entity identifying processing and entity authentication processing. The entity identifying processing is the processing for identifying who the user of the system is, and entity authentication processing is the processing for verifying whether or not the user is an authentic entity. In the former processing, generally a user identification name (user ID) or the like which is a known identifier is utilized. In the latter processing, the intrinsic authentication processing is performed, utilizing information which is available only to an authentic person.

The following description regarding the entity authentication mechanism explains the entity authentication processing.

The entity authentication mechanism can be roughly classified into four types, depending on the data used in authentication: authentication using knowledge, authentication using cipher, authentication using possession and authentication using biological characteristics. Details thereof will be described next.

Authentication Using Knowledge

Entity authentication using knowledge is a technique for verifying authenticity of an entity by registering in advance, information necessary for authenticating the entity, and verifying the authenticity of the entity by whether or not the entity subjected to authentication knows the information. The most well-known technique used in authenticating an individual is a "password," "code number" or "information known to nobody but the authentic person (address, birthday or the like).

Most systems perform user verification by using a password. Such entity authentication using knowledge is relatively easy to introduce and is effective. However, it has a high risk of being easily discovered by a third person, because an easy-to-remember character string is often used as a password, or the password is written down in a non-private place, or is wiretapped during communication. Moreover, even if a password is enciphered at the time of transmission, if the same password is used every time, there is a risk of "masquerading" by a third person stealing the password and re-using it (replay attack). Furthermore, there is a risk that a password file (into which, generally, passwords of users are enciphered using their own password as cipher key to be stored) stored by a server is broken into by dictionary attack.

To take countermeasures to these threats, some schemes are necessary, for instance, changing a password each time. For this, in entity authentication utilizing knowledge, an advanced one-time password method has been suggested e.g., the one-time password scheme, challenge-response scheme or the like using one-way functions or random numbers.

Each of these schemes will be described below.

(1) One-time Password Scheme

The one-time password scheme is proposed by Bellcore Co. U.S.A. and is standardized in Internet under RFC (Request for Comments) (RFC-1938). Hereinafter, processing of the most famous S/Key scheme will be briefly described.

Assuming $\underline{A}$ is a client and B is an authentication server, the S/Key scheme takes the following steps.

1: a one-way function f is prepared.

2: $\underline{A}$ generates a secret random number R and an arbitrary value S called a public seed.

3: assuming Q=R+S, calculation is performed for f(Q), f(f(Q)), f(f(f(Q))), ..., and the results will be obtained as $X_1$, $X_2$, $X_3$, ..., $X_{100}$ and $X_{101}$.

4: $\underline{A}$ keeps $X_1, \ldots, X_{100}$ and R in secret and gives $X_{101}$ to B by off-line method. B keeps $X_{101}$.

5: When $\underline{A}$ logs into B for the first time, $\underline{A}$ sends $X_{100}$ to B as a password.

6: B calculates $f(X_{100})$ and compares the result with $X_{101}$ which has been stored. If they coincide, log-in is granted, while if they do not coincide, log-in is rejected. When log-in is granted, B discards $X_{101}$ and keeps $X_{100}$.

7: When $\underline{A}$ attempts to log-in the next time, $\underline{A}$ uses the next password $X_{99}$. Subsequently, B performs the same processing described above.

The S/Key scheme has the following advantages:

Because the password is for one-time-use only, even if a third person wiretaps and steals the password during communication, the password cannot be reused.

The password kept by server B is used to inspect a password of the next log-in. Therefore, it would not be problematic even if this password is stolen.

Since the function f is a one-way function, even if $X_n$ is stolen, $X_{n-1}$ cannot be calculated. Therefore, it would not be problematic even if a third person obtains the function f.

On the other hand, the S/Key scheme has the following disadvantages.

In the above case, if 100 passwords provided are all used up, the server must re-initialize the authentication program.

In the actual system, the server side must always keep the random number R so that the aforementioned re-initializing can be executed on-line. More specifically, at the time of re-initializing, the client transmits seed data S', which is different from the one before, to the server on-line (it would not be problematic even if S' is stolen), and the server calculates Q'=R+S' using R to newly generate $X'_{101}$. Therefore, if a third person somehow intrudes into the server, or if the server administrator derives the random number with ill intention, a password can be generated and the third person can "masquerade" as the client A.

(2) Challenge-Response Scheme

This scheme is one countermeasure against wiretapping in the password authentication, and includes the CHAP (Challenge Authentication Protocol, RFC-1334) scheme as the typical example. FIG. 2 shows the steps of authenticating requester A by authenticator B according to the CHAP scheme.

The challenge-response scheme has an advantage in that even if a third person wiretaps the message ② (FIG. 2), reusing the message is impossible because the challenge changes each time. On the other hand, the challenge-response scheme has a disadvantage in that, because the requester A's password is kept by the authenticator B, anyone who administers the authentication server B can abuse the password and "masquerade" as the client A.

Authentication Using Cipher

Entity authentication using cipher is a technique for verifying authenticity of an entity by generating authentic data, which is difficult to forge by an entity other than concerned parties, with the use of encryption technique, exchanging the authentic data between the concerned parties and inspecting it.

(1) Digital Signature Scheme

A digital signature is a mechanism which verifies an individual on an electronic medium, instead of the conventional verification using a signature or seal impression when conducting business in documents. Functionally, the digital signature must satisfy the following three conditions:

① A signature clause cannot be forged by a third person;

② A signature clause cannot be forged by a recipient; and

③ A sender of the signature clause cannot deny later the contents of the signature clause and the fact of transmitting the signature clause.

In the present situation, the use of public-key crypto-system is indispensable in order to satisfy the above conditions ② and ③. The public-key crypto-system is the concept developed by Diffie and Hellman at Stanford University in 1976, in which a pair of enciphering key and deciphering key which are different from each other is provided, and only the deciphering key is kept in secret while the enciphering key is available to public. The public-key crypto-system has an advantage of easy key transmission, less types of key to be kept in secret, and its authentication function (digital signature). A general model of the public-key crypto-system is shown in FIG. 3.

When the relationship of the public key and secret key is reversed, digital signature function is realized. More specifically, a plain text message is enciphered by using a secret key known only to a sender and the enciphered message is sent to a receiver. The receiver deciphers the enciphered message by using a public key of the sender and derives the plain text message. In this case, since the enciphering key is known only to the sender of the message, the enciphered message cannot be forged by a third person or the receiver. Further, since only the individual who has the enciphering key can encipher the plain text message and transmits the enciphered message, the individual cannot deny the contents of the enciphered message or the fact of transmitting the enciphered message. Therefore, this method satisfies the above conditions of digital signature.

The leading algorithm presently available in the world, which realizes the concept of the public-key crypto-system is the RSA, which is developed by Rivest, Shamir and Adleman in MIT and is named after the first letters of their names. Note that there are the following two methods for the digital signature system which are about to be standardized internationally.

Authenticator verification—ISO/IEC CD 14888 PART1/2/3 (Sep. 21, 1995)

Giving message recovery—ISO/IEC 9796:1991 (E)

Among them, the widely-used method is the authenticator verification, whose overall processing is shown in FIG. 4.

In order for a receiver to verify authenticity of a sender by using a digital signature, it must be guaranteed that the public key of the sender is truly the sender's public key. For instance, a certificate which is equivalent to a registration certificate of seal impression, certifying authenticity of a physical seal impression, is necessary also to the digital signature. A public-key certificate system specialized in such certifying is established, and the certificate-issue agency is called Certification Authority (CA). The CA, established as the Internet standard (RFC1421–1424), issues and administers public-key certificates.

The format of the certificate is set up as an international standard (X.509→ISO9594-8). The third edition of X.509 is available, and the corresponding ISO standard is in progress of being established. The certificate includes items such as a user's identifier, user's public key, expiration date of the certificate, serial number, name of certificate-issue agency, digital signature of certificate-issue agency and the like. At the end of these items, a digital signature signed by the CA is added.

In the example shown in FIG. 4, a sender A transmits a message containing A's signature and an A's public-key certificate to a receiver B. The receiver B first inspects the digital signature signed by the CA on the public-key certificate to verify the authenticity of the A's public-key certificate. If it is verified as authentic, B considers that the A's public key is authentic. Then, B inspects A's digital signature to verify sender's authenticity.

An advantage of the authenticator verification is in that "masquerading" by a third person is generally difficult as long as strict control of CA is present and the sender securely keeps his/her secret key. However in a case of using the signature as a password for remote log-in via network (i.e. digital signature is used as authentication data), "masquerading" by a third person is possible if the password is stolen and reused (replay attack).

(2) Authentication Token Scheme with Digital Signature

The authentication token scheme with digital signature has improved resistance to the replay attack which is likely to occur in the above-described digital signature scheme (1). A brief processing of the authentication token scheme with digital signature will be shown in FIG. 5.

It is assumed as a precondition of the authentication token scheme that the client A has an A's public-key certificate which has been digitally signed by the use of a secret key of the CA, while the server B has the CA's public key.

In this condition, the client A transfers the server B, data consisting of the following ① to ④ as authentication data (hereinafter referred to as authentication token). The authentication token includes a time stamp T indicative of the time at which the token is generated.

①: A's public-key certificate (Ca)
②: time stamp (T)
③: receiver's ID: B's e-mail address or the like
④: digital signature (Sa) of ② and ③

The server B, who receives the authentication token, first inspects the signature and confirms that the time stamp T and so forth is not tampered, then compares the time stamp T with the present time. If the comparison result is almost equal, the server B grants the log-in request of the client A.

However if a predetermined time period has passed since the time stamp T, the server B regards that the authentication token is reused (replay attack) by a third person other than the client A and server B, thus rejects the log-in request.

An advantage of the authentication token scheme is in that "masquerading" by a third person is quite difficult as long as strict control of CA is present and the sender securely keeps his/her secret key. On the other hand, there is a disadvantage in that "masquerading" by a third person is possible if a stolen authentication token is reused (replay attack) within the predetermined time period.

(3) SSH (Secure SHell) Scheme

The SSH scheme is a security package for an r-type command process such as rsh/rlogin for remote log-in in UNIX system, and is considered as an Internet draft. Processes related to authentication processing will be described below, which is basically equivalent to a challenge-response authentication scheme using both the common-key enciphering and public-key enciphering.

FIG. 6 shows a sequence taken when the client A logs into a server B. The processing in FIG. 6 is divided into phases (② and ③) for sharing a session key used for common-key enciphering (DES, IDEA and the like), and phases (④, ⑤ and ⑥) for performing authentication processing. The processing sequence is described below.

① Client A sends a log-in request to server B.
② Based on the log-in request, the server B sends the client A, a public key of the server B, random number and the like used for session-key sharing.
③ Client A generates a session key, enciphers the session key by using the public key of the server B and sends it to the server B. When the server B receives the enciphered session key, the session key is shared by the client A and server B. In the subsequent processing, all messages transferred between the client A and server B are enciphered by the session key and transmitted.
④ Client A sends a public key and user name of the client A to the server B.
⑤ The server B verifies that the public key and user name of the client A are registered, generates challenge data (random number) for authentication, enciphers the challenge data by using A's public key and sends it to the client A.
⑥ Client A calculates a hash value of the challenge data, and sends the calculated value to the server B as challenge-response data.
⑦ The server B compares the value of the challenge-response data received in step ⑥ with a hash value of the stored challenge data directed to the client A, and if they are the same value, the log-in request is granted to the client A, while if they are different, the log-in request is rejected.

An advantage of the SSH scheme is in that since the challenge data changes each time, "masquerading" by a third person is impossible even if the third person steals a message in the processing sequence ⑥. However, there is a disadvantage in that, if an administrator of the server B changes the client A's public key with ill intention, the administrator can "masquerade" as the client A.

(4) RPC Authentication Scheme

The RPC (Remote Procedure Call) authentication scheme is a remote procedure calling function often used in the UNIX distributed environment system, and employs a user authentication function as security function.

The RPC authentication scheme includes functions for a server to verify who the issuer of the RPC is (entity authentication function), and how much authority the issuer has, and so forth. The entity authentication function of the RPC authentication scheme is briefly shown in FIG. 7, and steps thereof will be described below.

① Prior to communication, a client and a server share a common key ($K_{ab}$) used for DES enciphering, by the use of the DH method (Diffie-Hellman key agreement protocol). In the UNIX world, public keys and secret keys used in DH method are controlled by NIS (Network Information Service). Each user derives a public key of the other party and a secret key of its own registered at NIS in advance prior to the communication, and obtains a shared key (DES key) by calculation.

② The client generates authentication data by the following procedure and sends it to the server.

(I) Client generates a character string (called net name) indicative of the sender. In the case of UNIX, the character string includes the following form: unix.<user ID>@<host address>.

(II) Client generates a session key (random number: K).

(III) Client enciphers a time stamp (present time: T) according to DES (Data Encryption Standard) by using the session key (K), and obtains an enciphered time stamp ($T_e$).

(IV) Client enciphers the session key (K) according to DES by using the shared key ($K_{ab}$), and obtains an enciphered session key ($K_e$). As authentication data, the net name generated in (I) enciphered time stamp ($T_e$) generated in step (III) and enciphered session key ($K_e$) generated in step (IV) are sent to the server.

③ The server deciphers the enciphered time stamp ($T_e$) included in the received authentication data, compares the time stamp with the present time to verify authenticity of the net name. More specifically, if the difference between T and the present time is within a permissible range, the access request of the net name is granted, while if the difference exceeds the permissible range, the access request is rejected.

An advantage of the RPC authentication scheme is in that "masquerading" by a third person is quite difficult as long as every and all clients and servers keep their secret keys strictly and they securely obtain public keys of the other sides on networks. On the other hand, there is a disadvantage in that "masquerading" by a third person is possible if stolen authentication data is reused (replay attack) within a predetermined time period.

(5) Kerberos Scheme (RFC1510)

Kerberos is a user authentication system developed by the Athena Project in MIT, and is based on the "Authentication Scheme by Reliable Third-Party Organization" proposed by R. Needham and M. Schroeder in 1978. The Kerberos scheme is adopted as the authentication service in the DCE (Distributed Computing Environment) which is a software package set by OSF (Open Software Foundation) for constructing a distributed processing environment.

In the Kerberos scheme, communication security, user authentication and the like are all realized by using only the common-key enciphering scheme (DES: Data Encryption Standard).

The Kerberos scheme adopts the system in which authenticity of each user is guaranteed by the authentication server based on a precondition that the user key is known only to the user and authentication server.

The portion serving as the authentication server is separated into a Kerberos server and a TGS (Ticket Granting Server) so that passwords or keys of users are not stored in the user's system for a long time where security level is low. In addition, the Kerberos scheme adopts concepts of Ticket and Authenticator to improve security further. The Kerberos authentication scheme is shown in FIG. 8.

The Kerberos authentication scheme has an advantage in that it is resistant to wiretapping because communications between each server and users WS are all enciphered and the enciphering key is generated each time by random numbers, and that an object server does not need to manage user IDs and passwords, but only the Kerberos server has these data. However, the Kerberos authentication scheme has the following disadvantages.

If it is within a predetermined time period, stolen authentication data can be reused (replay attack).

Since exporting enciphered products is limited in the U.S., Kerberos-products adopting the DES (Data Encryption Standard) as enciphering algorithm may not be usable outside of the U.S.

Since the authentication server centrally administers authentication data and enciphering keys of the users, if a third person with ill intention succeeds in intruding into the authentication server, the domain subjected to administration will be completely destroyed.

All machines and applications need to comply with Kerberos scheme, and introduction thereof is cumbersome.

(6) Zero-Knowledge Proofs and Interactive Proofs Scheme

This scheme is proposed in 1985 by Goldwasser and Micali of MIT and Rackoff of Toronto University, and is a scheme for a sender to convince a receiver the fact that the sender has certain information, without disclosing the information. An example of applying this scheme is when the fact of knowing a password is proven to another party without showing the password. In 1986, the Fiat-Shamir scheme was proposed by Fiat and Shamir and was disclosed in U.S. Pat. No. 4,748,668 (Japanese Patent Application Laid-Open No. 63-101987).

FIG. 9 shows the processing sequence according to the zero-knowledge proofs and interactive proofs in a case where a client A (prover) transfers secret data T (password and the like) to the server B (verifier). Herein, the client A has full knowledge of $Z=T^2 \mod n$ while the server B only knows Z and n. Herein, n is a composite number of large prime numbers p and q. In this case, if the server B cannot factor n into prime factors, it is extremely difficult to derive T.

The following steps ① to ④ are repeated k times (that is why it is called interaction) and the authenticity of client A is inspected.

① Client A selects a random number R, calculates $X=R^2 \mod n$ and sends X to the server B.

② The server B alternatively and randomly selects $b \in \{0, 1\}$ and sends b to the client A.

③ Client A sends Y to server B (Y is R in case of b=0, and in case of b=1, Y is TR mod n).

④ The server B inspects whether or not the following equations are satisfied:

$$\text{in case of } b=0, X=Y^2 \mod n$$

$$\text{in case of } b=1, ZX=Y^2 \mod n$$

and if these are satisfied, client A passes the inspection. In steps ③ and ④, the inspection is separated for the case of b=0 and the case of b=1 because a client A', masquerading as client A, can pass the inspection in the following manner, even if the client A' does not know the value T.

More specifically, assuming b=1 is always satisfied, client A decides an appropriate value Y' as a value Y in step ①, calculates $X=(Y')^2/Z \mod n$, and sends the value X to the server B. When the value of Y=Y' is sent in step ③, the client A naturally passes the inspection in step ④.

In this method, since values X and Y which satisfy the inspection equation are calculated after predicting the value b, there is ½ probability of succeeding in "masquerading" per one loop of steps ① to ④. Therefore, if this steps are repeated k times, the masquerading probability can be reduced to $2_{-k}$.

An advantage of this scheme is in that since the client A does not need to inform the server B of secret authentication data T in advance, an administrator of the server B, even an authentic administrator, cannot masquerade as the client A. However, the following disadvantages are pointed out: the interactive sequence is redundant; the authentication process is complicated; and improving performance and improving precision in authentication are realized at the expense of the other.

Authentication Using Biological Characteristics

Next, the conventional security technique using biological characteristics (individual attributes) will be described.

The technique utilizes physical and behavioral characteristics of an individual as authentication data to verify the authenticity of a terminal user. Examples of the physical and behavioral characteristics are as follows:

Physical characteristics: fingerprint, voice spectrum, face pattern, hand print, retina pattern, ear shape Behavioral characteristics: signature, handwriting pattern, key stroke Since this scheme employs a unique individual attribute as authentication data, the precision of authenticity is high if verification succeeds. However, the likelihood of being accurate in verification is not 100%, as exemplified by such case that even an authentic individual fails to be verified.

Therefore, this scheme still leaves rooms for technical improvement. Even though the scheme is effective in the field of authenticating a terminal user, on-line authentication (local authentication) and the like, it has disadvantages in that, in a case of utilizing this scheme in authentication over networks, reusing (replay attack) authentication data by wiretapping i.e., "masquerading" can occur.

Authentication Using Possession

Next, the security technique using possession will be described.

In this technique, a specific object has authentication data, and an authenticator inspects the authentication data included in the object to authenticate an individual who holds that object, an individual who is verified by the object, or software/hardware which operates in conjunction with the object, as an authentic entity.

Examples of possession are as follows:
key, token, badge
electronic key
magnetic card
IC card
non-contact type card (advanced-type IC card e.g., an optical type card, electromagnetic wave type card and so on)

For instance, an individual who possesses a key, token or electronic key to unlock a terminal is authenticated as an authentic user of the terminal.

However, in order to eliminate the abuse of such possession caused by loss or theft of the possession, this authentication technique is often employed in combination with the "knowledge" technique when authentication is performed via network. For instance, a user is first identified by a possession such as a magnetic card, then authenticity of the user is verified by a server (host computer at access destination) inspecting a code number or the like.

This is further developed in the use of IC card. First, an IC card it self verifies an individual who is about to use the IC card by requiring a code number, and when this verification succeeds, the authentication operation by the server is initiated via network. The server performs authentication processing using the IC card (i.e. entity such as an individual, verified by the IC card) by using the "knowledge" technique or "cipher" technique.

This technique has an advantage in that "masquerading" by a third person is generally difficult as long as the "possession" is securely kept. In addition, an IC card normally has a tamper free feature so that data stored in the memory cannot be externally read or written. Therefore, personal data such as an enciphering key, password or the like can be stored and managed relatively safely. Moreover, by incorporating the security processing function into an IC card, even securer authentication communication is enabled. On the other hand, in most cases of the authentication system using possession, a dedicated input/output device is required between the possession and client terminal. Moreover, in a case of authentication processing using a magnetic card, IC card or the like via network, the authentication sequence uses the same technique as that in the "knowledge" technique or "cipher" technique. Thus, the aforementioned disadvantages of these techniques are inevitable.

As has been described above, the conventional techniques of various entity authentication schemes have both advantages and disadvantages.

The direct threat to the entity authentication is "masquerading" which occurs when a third person obtains a password and the like without authorization. When a third person succeeds in "masquerading" and intrudes into a system, the system faces threats of various unauthorized actions e.g., tampering data, destroying files, generating wrong data and so forth. Furthermore, such threats are not only caused by external unauthorized accesses, but also by an internal crime such as a system administrator or the like.

Accordingly, for the system which is the subject of being accessed, entity authentication for verifying an identity of the accessing entity is the forefront defense network, and its level of importance increases according to the system confidentiality.

The table in FIG. 10 briefly shows the resistance to "masquerading" attempted by an external and internal unauthorized entities, in each of the entity authentication schemes.

Although the above-described schemes have disadvantages, some may sufficiently serve as an authentication function depending on the environment and structure of the system. However, as shown in FIG. 10, most schemes are vulnerable to the threats generated by internal crimes caused by an individual such as a system administrator who has a thorough knowledge of the system. Even if the scheme is capable of protecting from such internal crimes, there is a disadvantage that authentication processing is complicated.

As has been set forth above, entity authentication is the forefront defense function against the various threats to the security system. Taking into consideration of the wide areas of its application and its characteristic of interactive connection, an expected new authentication scheme must be simple in its introduction, simple in its structure, and effective to the above threats. In view of the advantages and disadvantages of the above-described various authentication schemes, the following conditions are required for a new authentication system.

(1) Authentication data stolen by wiretapping cannot be reused by a third person.

For instance, the one-time password scheme satisfies this condition. However in the authentication token scheme with digital signature, if the stolen data is reused within a permissible time period of the time stamp, the stolen token can be reused.

(2) Authentication data is not stored in an authentication server.

More specifically, an authentication server does not need to store authentication data of each user, but only needs the function to identify whether or not the authentication data at the time of log-in is correct. If this condition is satisfied, even if a third person with ill intention intrudes into the server, user's authentication data cannot be derived.

(3) Authentication sequence is simple.

By satisfying this condition, the load added to the system is minimized and the operation is stabilized. Therefore, interactive sequences e.g., the challenge-response scheme or zero-knowledge proofs and interactive proofs, are not used.

(4) Authentication data is different each time and the data exists infinitely.

By satisfying this condition, the conventional periodic operation performed in the one-time password scheme (S/Key and the like) e.g., re-registering initializing data with the server when all passwords are used up, is eliminated, while satisfying the above condition (1).

(5) A special external measurement device, such as that required in the authentication using biological characteristics, is not required.

Since a special device reduces the interactive operability via Internet and increases cost, it is preferable not to use such external device.

SUMMARY OF THE INVENTION

The present invention has been made in consideration of the above situation, and has as its object to provide an authentication method, authentication apparatus and authentication server utilizing a simple authentication scheme, where reusing authentication data by a third person is extremely difficult even if authentication data is stolen.

According to the present invention, the foregoing object is attained by providing an authentication method for authenticating an authentication requester by using a public-key enciphering scheme in response to an authentication request sent by the authentication requester, comprising: a storing step of storing first inspection data into an authenticator's memory in advance for inspecting authentication data of the authentication requester; an authentication request sending step of sending an authentication request from the authentication requester to the authenticator; an authentication-data requesting step of sending an authentication-data request from the authenticator to the authentication requester in response to the authentication request sent by the authentication requester; an authentication-data sending step of sending from the authentication requester to the authenticator, in response to the authentication-data request, first authentication information which is generated by enciphering first seed data held by the authentication requester with utilizing a secret key of the authentication requester, and storing the generated first authentication data as second seed data for a next authentication request in place of the stored first seed data; a comparing step of deciphering the first authentication data, sent by the authentication requester, by utilizing a public key of the authentication requester, generating second inspection data, and comparing the second inspection data with the first inspection data stored in advance; and an updating step of notifying the authentication requester of grant of the authentication request in a case where the second inspection data coincides with the first inspection data, and storing the first authentication data in place of the first inspection data in the memory.

According to the above authentication method, an authentication requester enciphers seed data (authentication data used at the time of previous log-in) by the requester's secret key and sends it to an authenticator as authentication data; the authenticator deciphers the received authentication data sent by the requester by using a public key of the authentication requester, and compares the deciphered data with inspection data (authentication data used at the time of previous log-in) stored by the authenticator; and authentication processing is achieved by inspecting whether or not they are coincident.

Accordingly, as long as the authentication requester securely keeps the secret key, a third person cannot generate authentication data even if the third person obtains the seed data stored by the authentication requester or the inspection data stored by the authenticator. Therefore, "masquerading" by a third person is impossible. Further, at the authenticator's side, the authentication data sent by the authentication requester is deciphered by the public key of the requester and the deciphered data is compared with the inspection data (authentication data used at the time of previous log-in) stored by the authenticator. If these are coincident, the authentication data is immediately stored as inspection data to be used next time. Therefore, a time-lag that allows a third person to steal the authentication data during transmission and use the authentication data to "masquerade" as the authentication requester is substantially zero, thus it is impossible for a third person to use the same.

To apply the above authentication method, the present invention provides an authentication server storing authentication data for granting authentication in response to an authentication request sent by a plurality of authentication requesters, comprising: a memory storing inspection data for inspecting authentication data of an authentication requester for each authentication request; sending means for sending an authentication-data request message to an arbitrary authentication requester when the server receives an authentication request from the arbitrary authentication requester; comparing means for generating new inspection data by deciphering authentication data sent by the authentication requester by utilizing a public key of the authentication requester, and comparing the newly generated inspection data with the inspection data stored in said memory; and grant means for granting the authentication request in a case where the newly generated inspection data coincides with the stored inspection data, and storing the authentication data sent by the authentication requester in place of the stored inspection data.

Further, the present invention provides an authentication apparatus for granting authentication, in response to an authentication request sent by an authentication requester, in support of an external authentication server, comprising: a memory storing seed data from which authentication data is generated for authentication of the authentication requester; sending/receiving means for sending an authentication request message to the authentication server, and receiving an authentication-data request message from the authentication server responding to the authentication request message; enciphering means for enciphering, in response to the authentication-data request message sent by the authentication server, the seed data stored in said memory by utilizing a secret key to generate authentication data; and authentication-data sending means for sending the generated authentication data to the authentication server, and storing the generated authentication data in said memory in place of the stored seed data.

Moreover, particularly for a terminal apparatus used by unspecified users, the present invention provides an authentication terminal apparatus for granting authentication to an authentication request sent by an authentication requester via a storage medium, in support of an external authentication server, comprising: a main body; and means for accepting a storage medium storing: seed data used for generating authentication data to authenticate an authentication requester, a secret key of the authentication requester and a program for generating authentication data based on the seed data utilizing the secret key, and the main body comprising: receiving means for receiving an authentication request from the authentication requester; requesting means for sending an authentication request message to the authentication server in response to the authentication request, and receiving an authentication-data request message from the authentication server responding to the authentication request; instructing means for executing the program stored in the storage medium via the interface means in response to the authentication-data request message, the instructing means instructing the program to generate authentication data of the authentication requester based on the seed data by using the secret key, instructing the program to return the generated authentication data to the main body via the interface means, and instructing the program to update the seed data stored in the storage medium with the generated authentication data; and authentication-data sending means for sending the returned authentication data to the authentication server.

Furthermore, in application of the aforementioned authentication method, the present invention is applicable to a storage medium storing programs adopted by an apparatus which is used by an authentication requester. More specifically, the present invention provides a storage medium storing an authentication program for granting authentication to an authentication request sent by an authentication requester, in support of an external authentication server, the authentication program comprising: first program code means for storing seed data in a predetermined memory for generating authentication data to authenticate the authentication requester; second program code means for sending an authentication request message to the authentication server; third program code means for receiving the authentication request message from the authentication server; fourth program code means for generating authentication data based on the seed data stored in the memory by utilizing a secret key in response to the authentication data request message; and fifth program code means for sending the generated authentication data to the authentication server and storing the generated authentication data as new seed data in place of the old seed data.

According to an aspect of the present invention, in a case where a notification of grant of the authentication request is received from the authentication server, seed data is updated, while in a case where the notification is not received, seed data is not updated. This is to assure identity of seed data at the authentication requester's side with inspection data at the authenticator's side.

According to another aspect of the present invention, identification data of the authentication requester is used as an initial value of the first seed data.

According to another aspect of the present invention, authentication data is sent to the authentication server together with a public-key certificate.

According to another aspect of the present invention, the memory stores a public key of each authentication requester together with inspection data.

According to another aspect of the present invention, in a case where two inspection data do not coincide, the authenticator rejects the authentication request.

According to another aspect of the present invention, the secret key of the authentication requester is enciphered such that only an authentic owner can decipher.

According to another aspect of the present invention, the storage medium is an IC card.

According to another aspect of the present invention, the storage medium further stores a password, compares a password inputted by the authentication requester with the password stored in the storage medium, and only when the passwords are coincident, returns the authentication data to the main body.

According to another aspect of the present invention, the generation of the authentication data based on the seed data by using the secret key is performed only within the storage medium so that the secret key is not sent to the main body.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a table showing disadvantages of the various conventional security schemes;

FIG. 19 is an explanatory view explaining the processing procedures according to a modified example of the present invention.

DETAILED DESCRIPTION OF THE PREFERRED EMBODIMENTS

Preferred embodiments of the present invention will be described in detail in accordance with the accompanying drawings.

Figure 1:
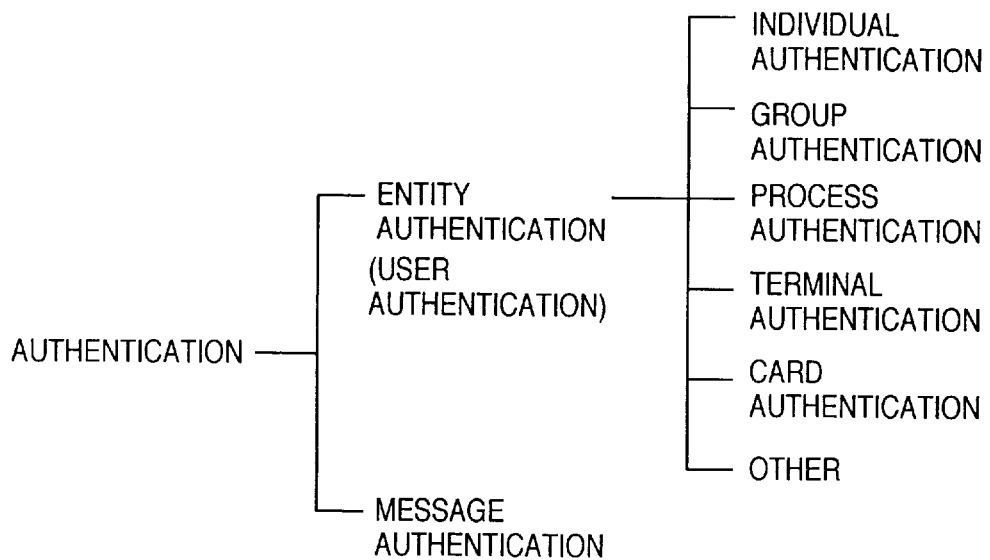
FIG. 1 is an explanatory view showing the classification of authentication.
Figure 2:
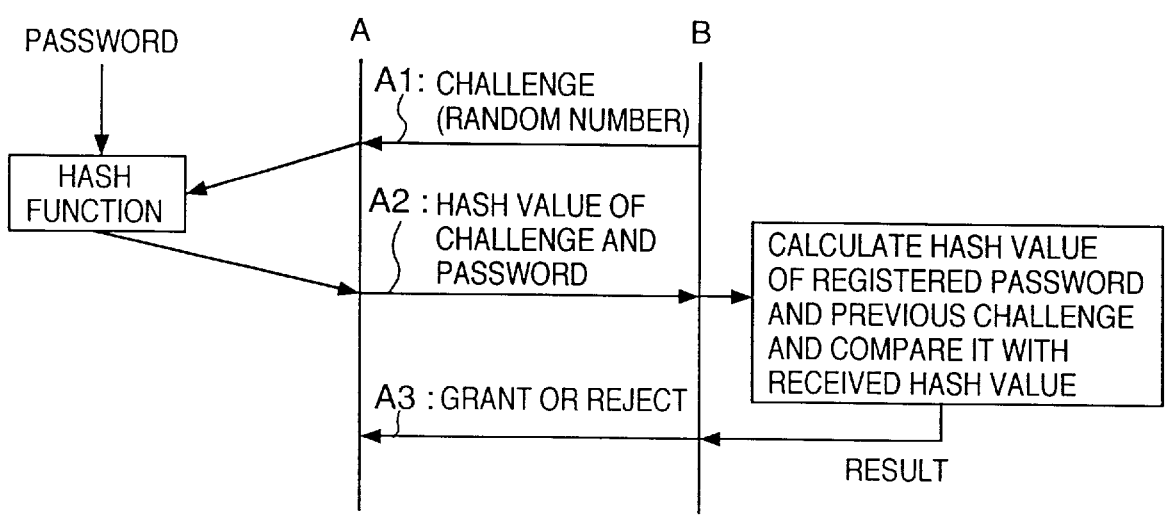
FIG. 2 is an explanatory view of the conventional challenge-response scheme.
Figure 3:
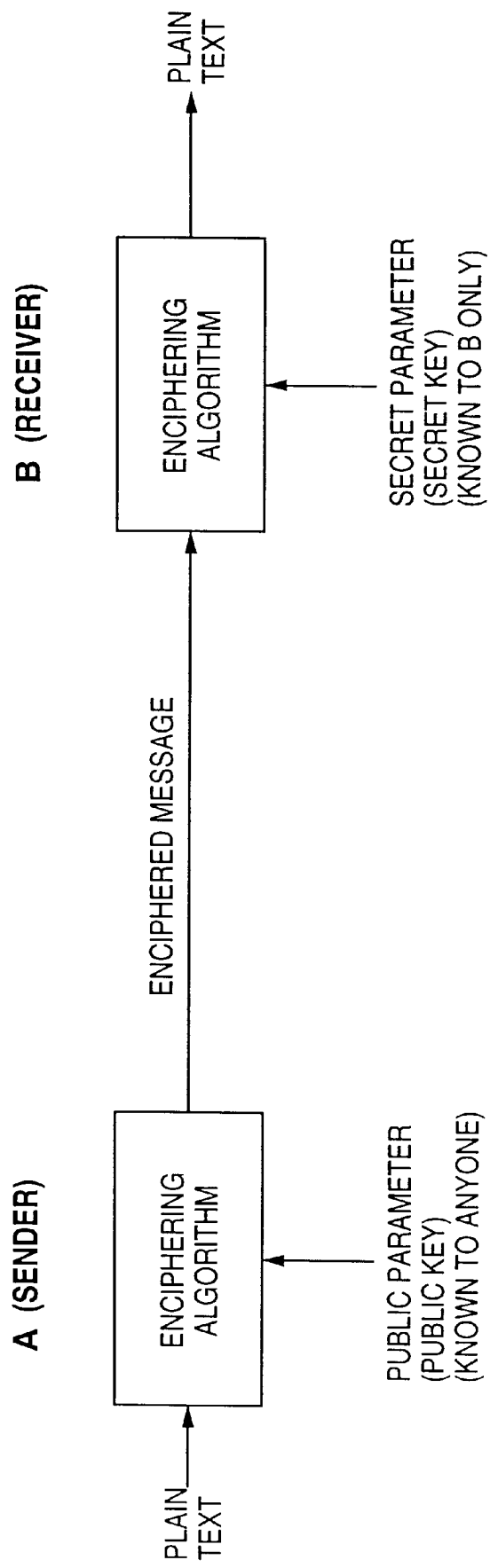
FIG. 3 is an explanatory view showing a general model of a public-key enciphering scheme.
Figure 4:
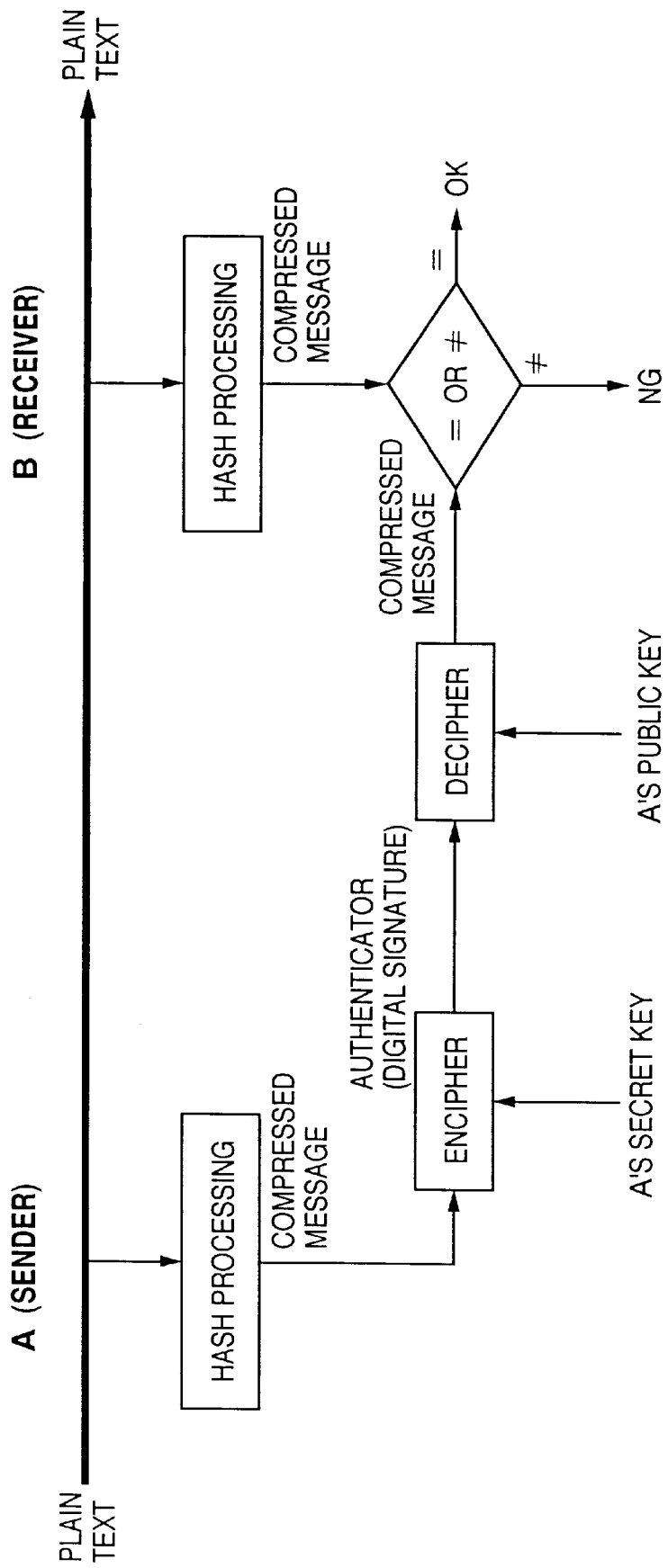
FIG. 4 is an explanatory view of the conventional authenticator verification.
Figure 5:
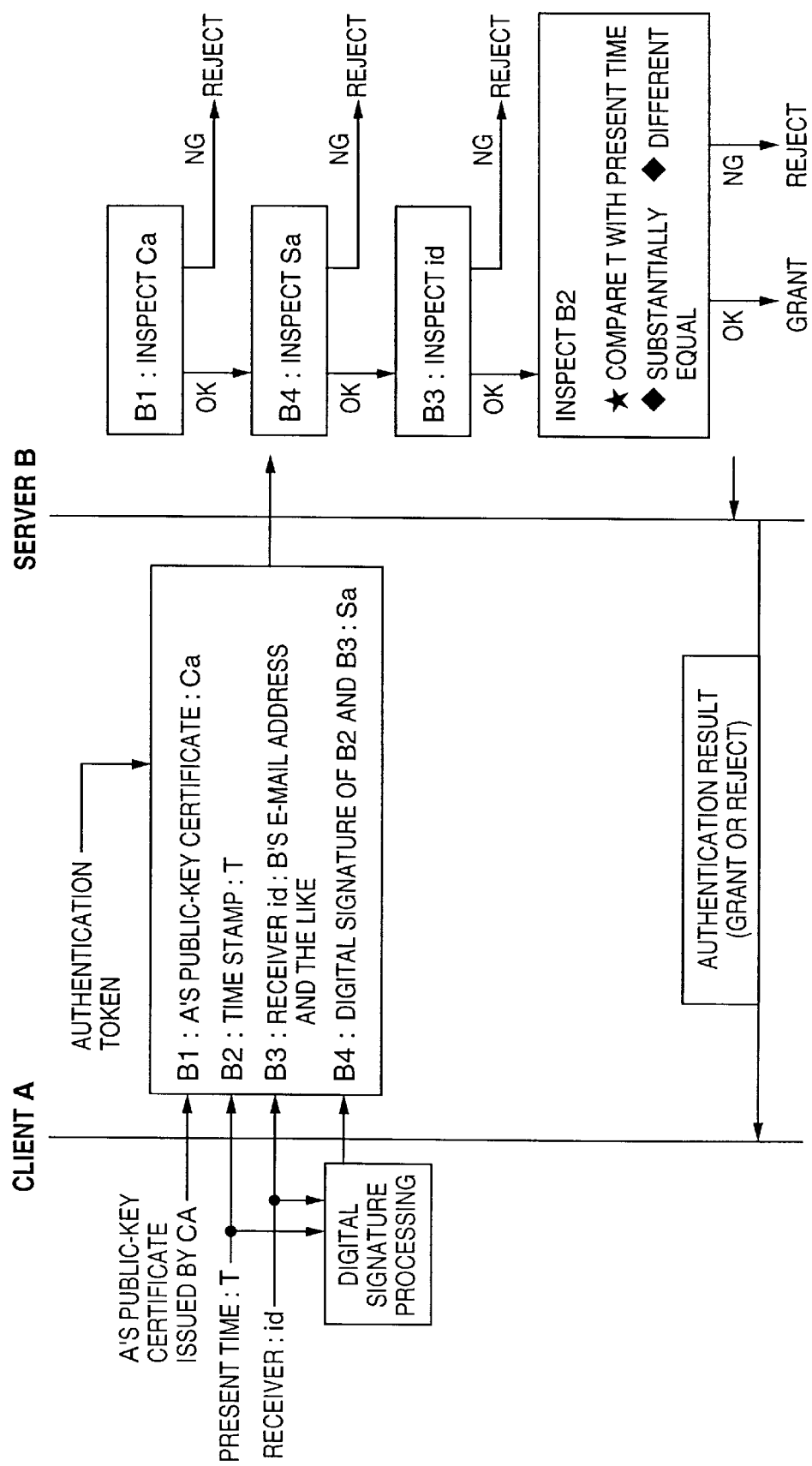
FIG. 5 is an explanatory view of the conventional authentication token scheme with digital signature.
Figure 6:
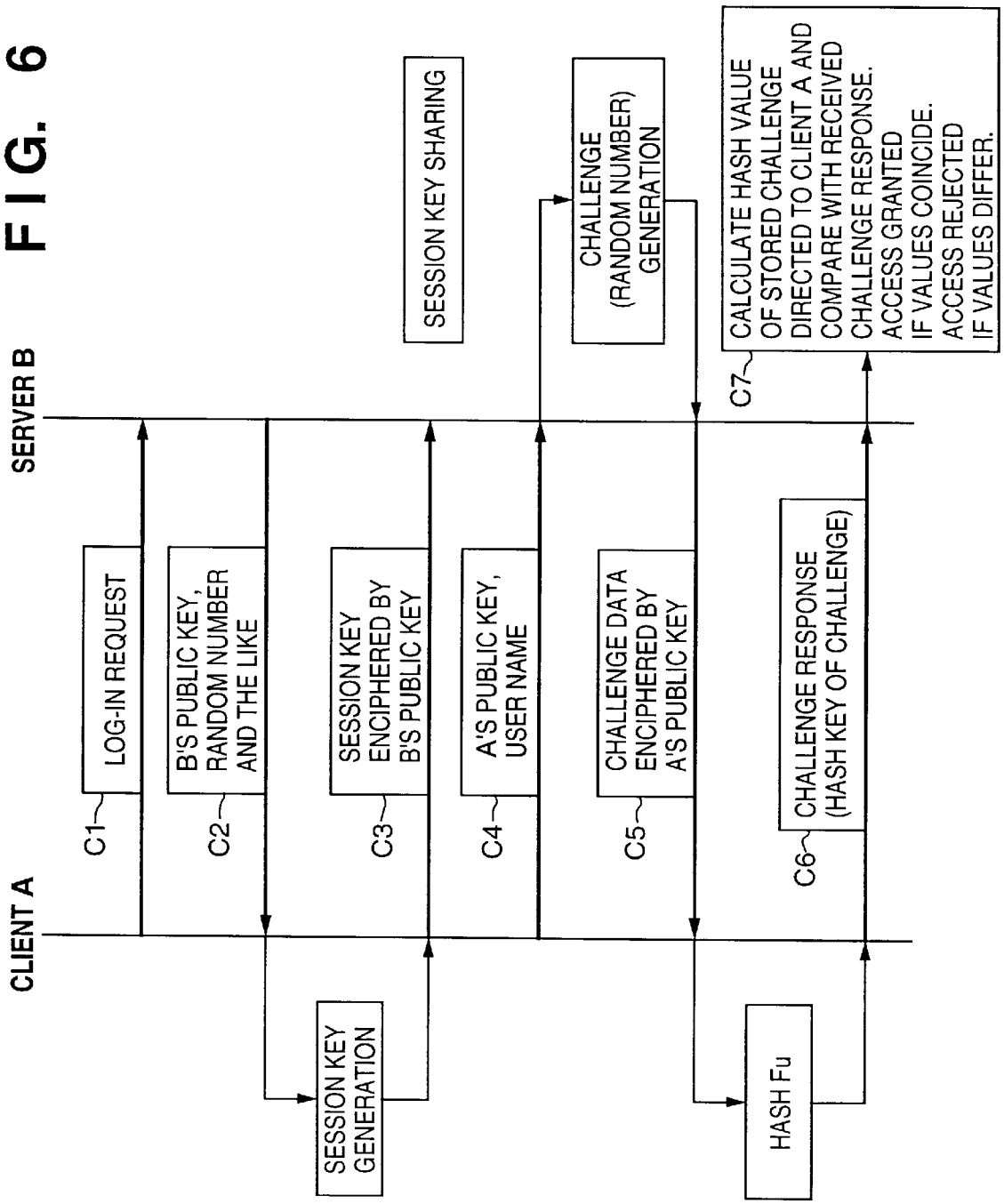
FIG. 6 is an explanatory view of the conventional SSH scheme.
Figure 7:
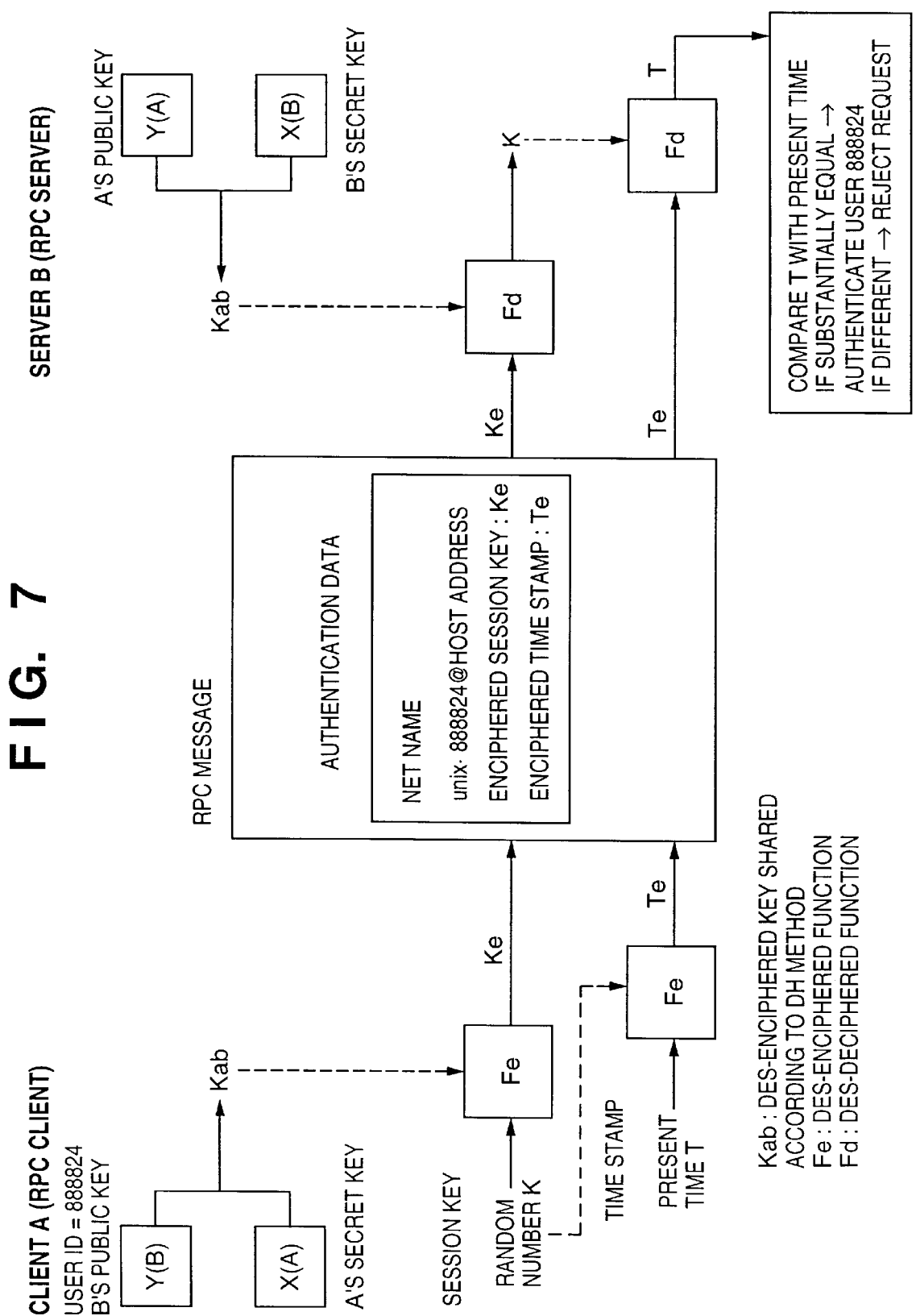
FIG. 7 is an explanatory view of the conventional RPC authentication scheme.
Figure 8:
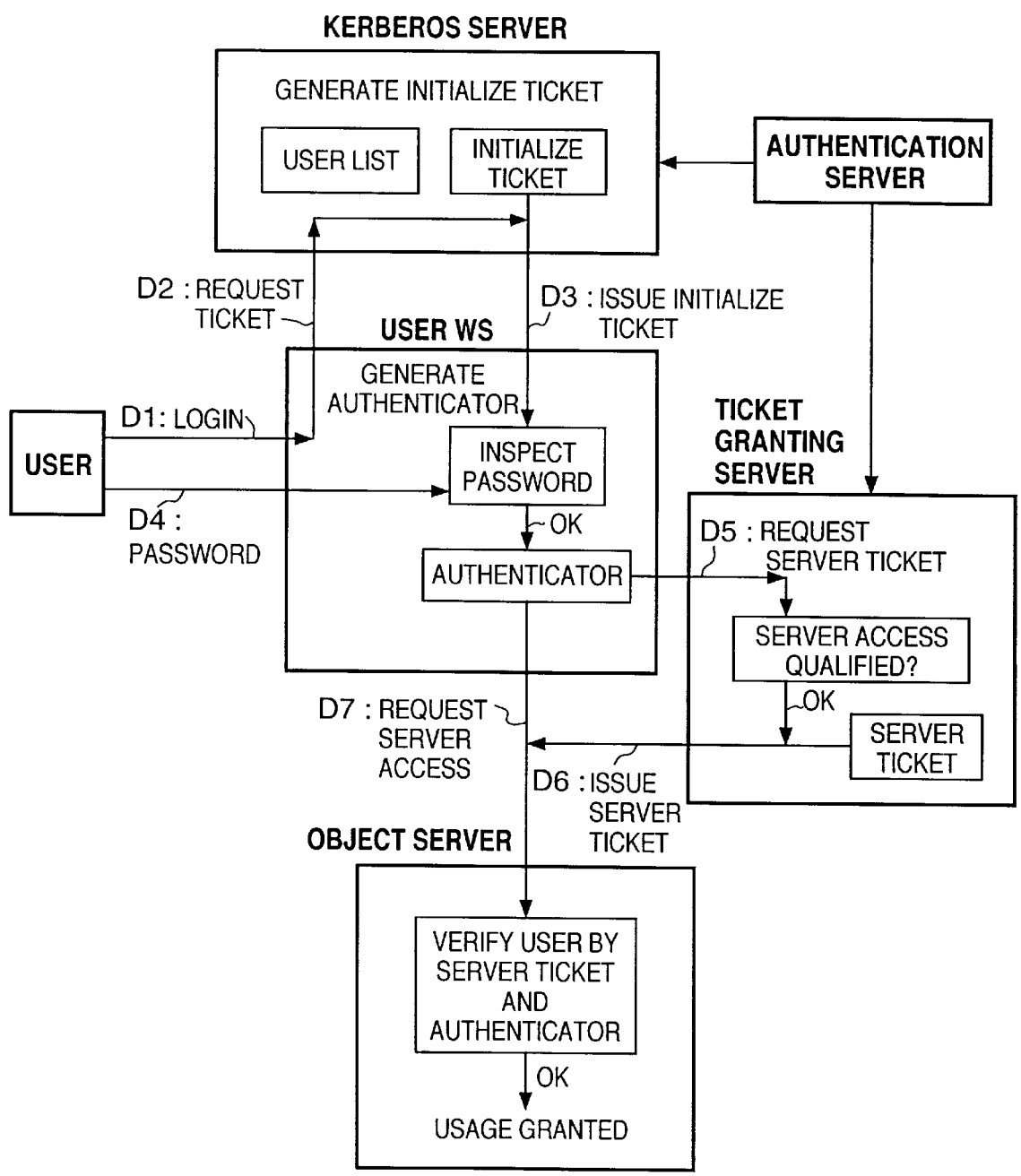
FIG. 8 is an explanatory view of the Kerberos authentication scheme.
Figure 9:
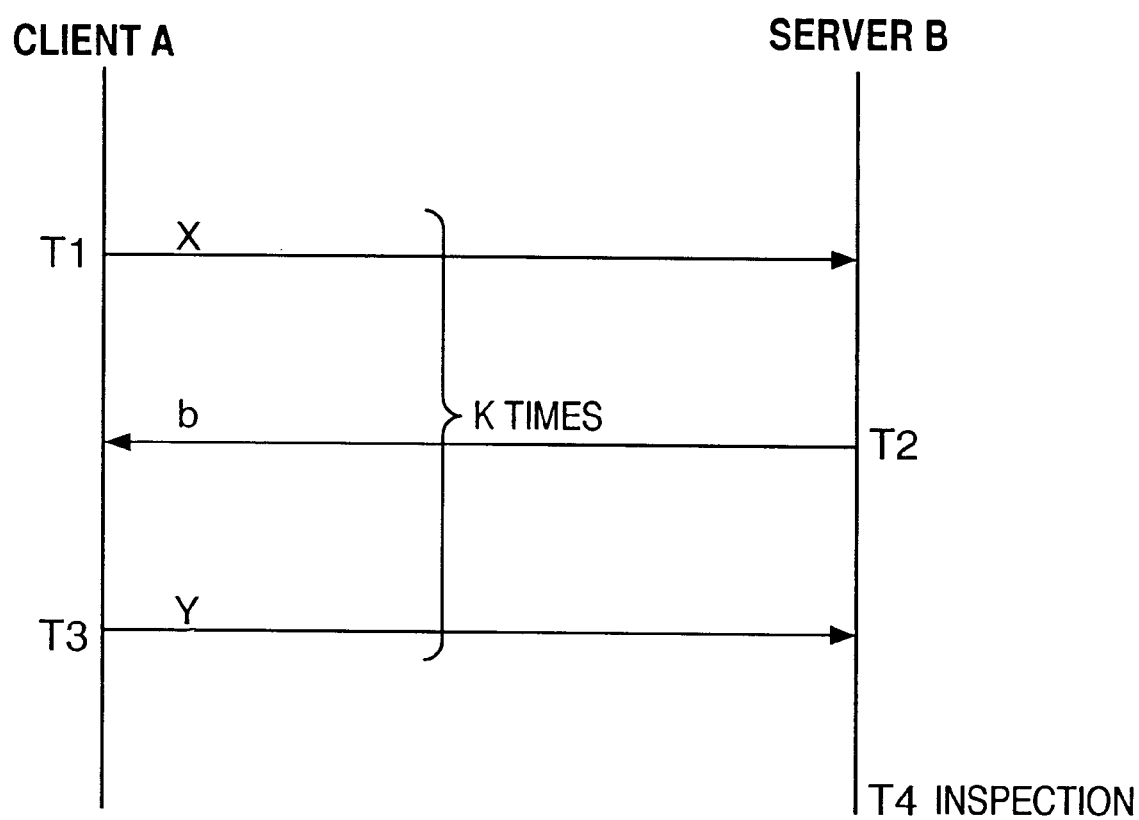
FIG. 9 is an explanatory view of the conventional zero-knowledge proofs and interactive proofs scheme.
Figure 11:
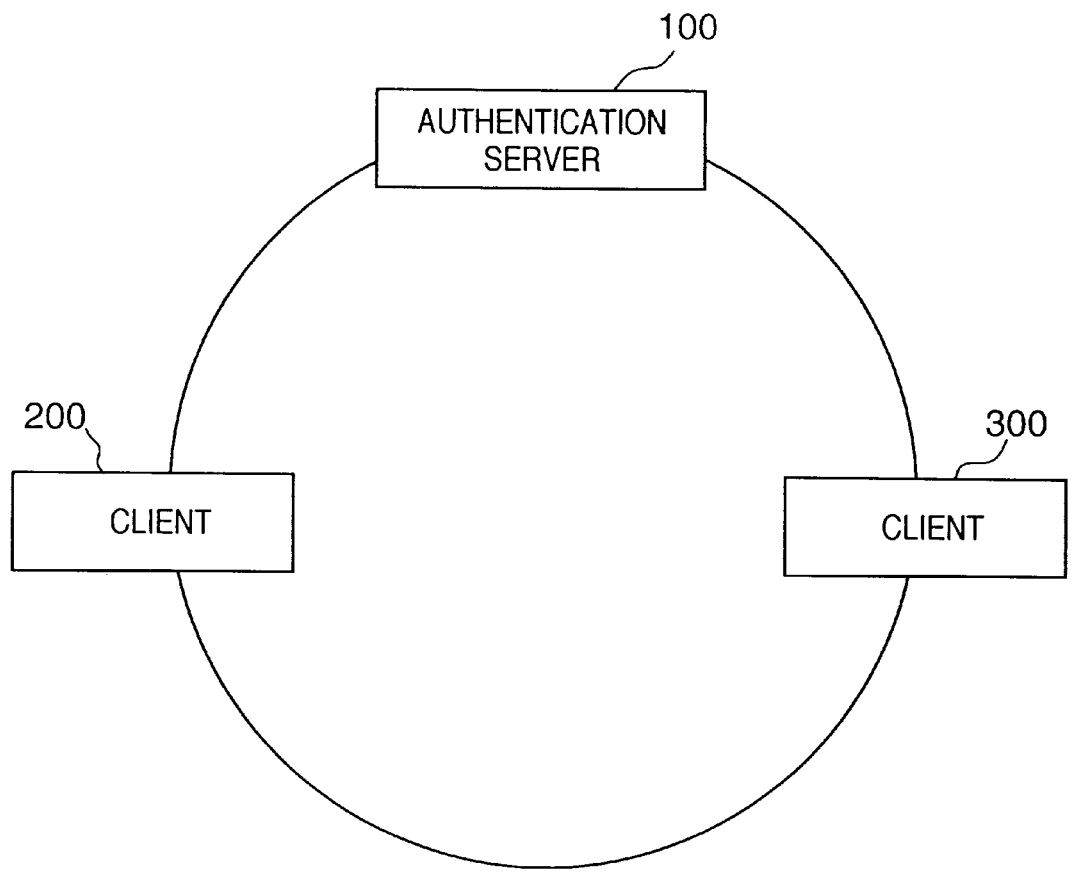
FIG. 11 is an explanatory view theoretically showing the construction of an authentication system according to the present invention.

FIG. 11 shows the construction of a network adopting the scheme according to the present invention.

In the network, plural clients 200, 300, . . . are connected via Internet. An authentication server 100 is also connected to the network.

When the client 200 communicates with the client 300, the client 200 serves as an authentication requester and client 300 serves as an authenticator. In the present embodiment, the authenticator is referred to as a server.

Figure 12:
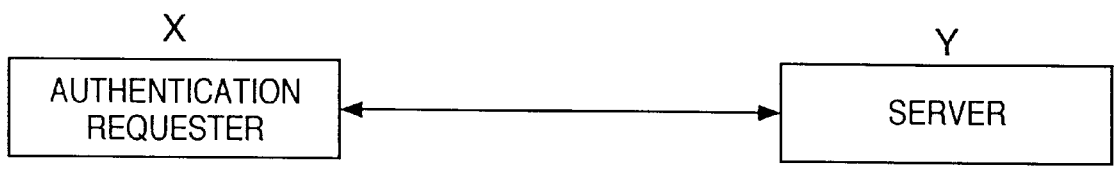
FIG. 12 is an explanatory view theoretically showing the construction of an authentication system according to the present invention.

The authentication server 100, including database to which plural clients can access, performs authentication in response to an authentication request made by the plural clients, and is referred to as an authentication server (See FIG. 11). FIG. 12 shows the idea where a client serves as a server when two clients are communicating with each other.

The authentication scheme according to the present invention does not require, as a precondition, the existence of the certification authority (CA). Data transmission between clients is sometimes directly performed without being intermediated by the CA, or sometimes performed via the authentication server 100 (e.g., CA or the like). An authenticator and authentication requester are not a person, but a computer (or system) operating in accordance with an operator/user's command.

Figure 13:
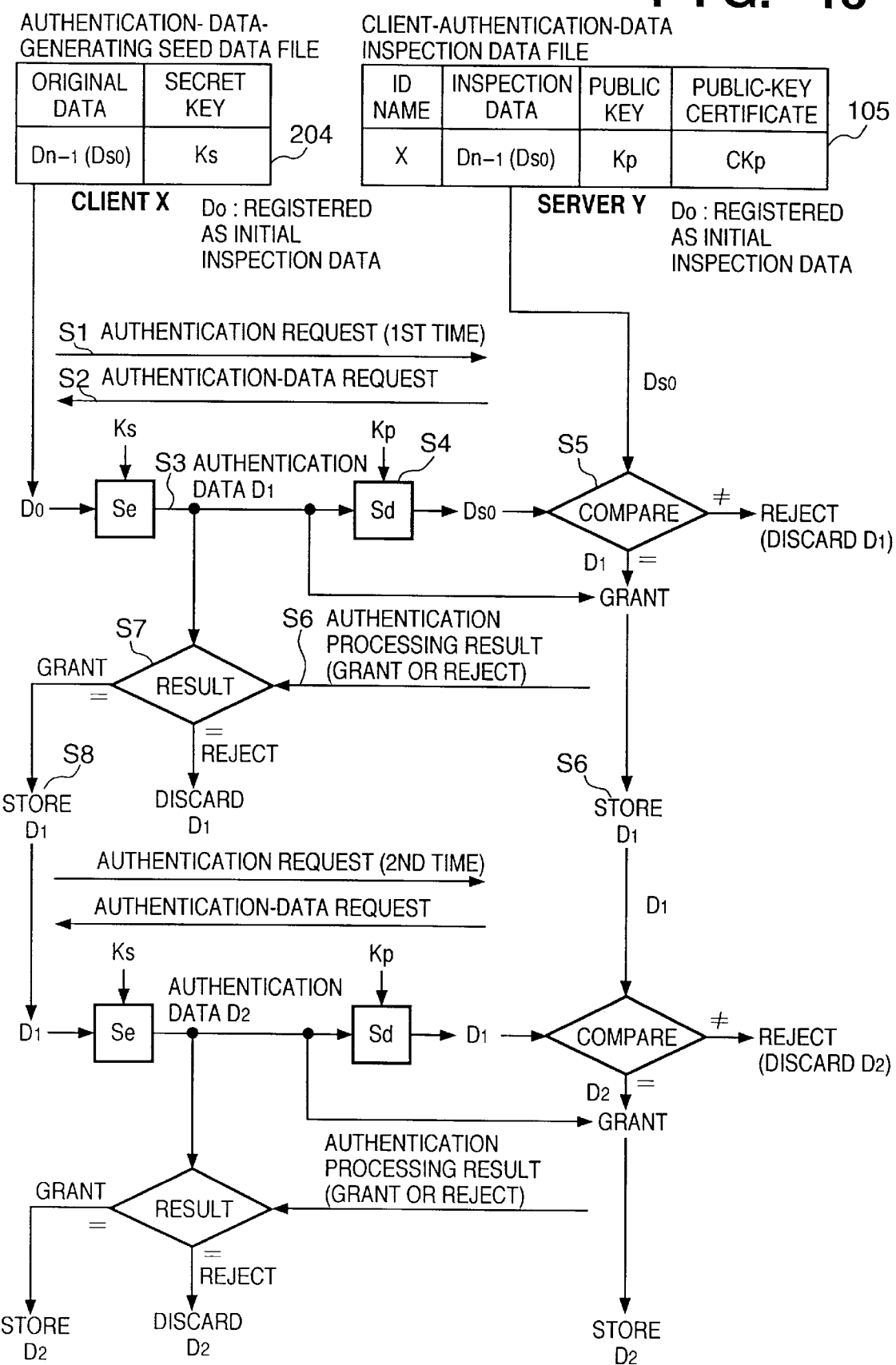
FIG. 13 is a flowchart explaining operation results of authentication steps according to an embodiment of the present invention.

FIG. 13 shows an example of authentication algorithm employing the present invention in a simplified network (FIG. 11) constructed with a client X serving as an authentication requester, and a server Y (serving as an authentication server which is an authenticator in this example). The example shown in FIG. 13 utilizes a public-key enciphering algorithm as a precondition. It is assumed herein that client X has its own secret key $K_s$, and the server Y has a public key $K_p$ corresponding to the client's secret key $K_s$, as well as a certificate $CK_p$ of the public key. Moreover, a reference letter $S_e$ denotes an enciphering function of the public-key enciphering algorithm; and $S_d$, a deciphering function of the public-key enciphering algorithm.

In the present system, as shown in FIG. 13, the client side has a seed data file 204 used for generating authentication data (referred to as "authentication-data-generating seed data file 204" hereinafter) while the server side has an inspection data file 105 used for inspecting client authentication data (referred to as "client-authentication-data inspection data file 105" hereinafter). The authentication-data-generating seed data file 204 stores seed data used for generating authentication data. In this system, "authentication data," indicative of data sent by the authentication requester to the authenticator to request authentication, is generated based on the seed data at the client side. At the server side, the inputted/outputted data is collated with the client's inspection data possessed by the server; and when they coincide, the server regards the client as an authentic requester.

Figures 14, 15:
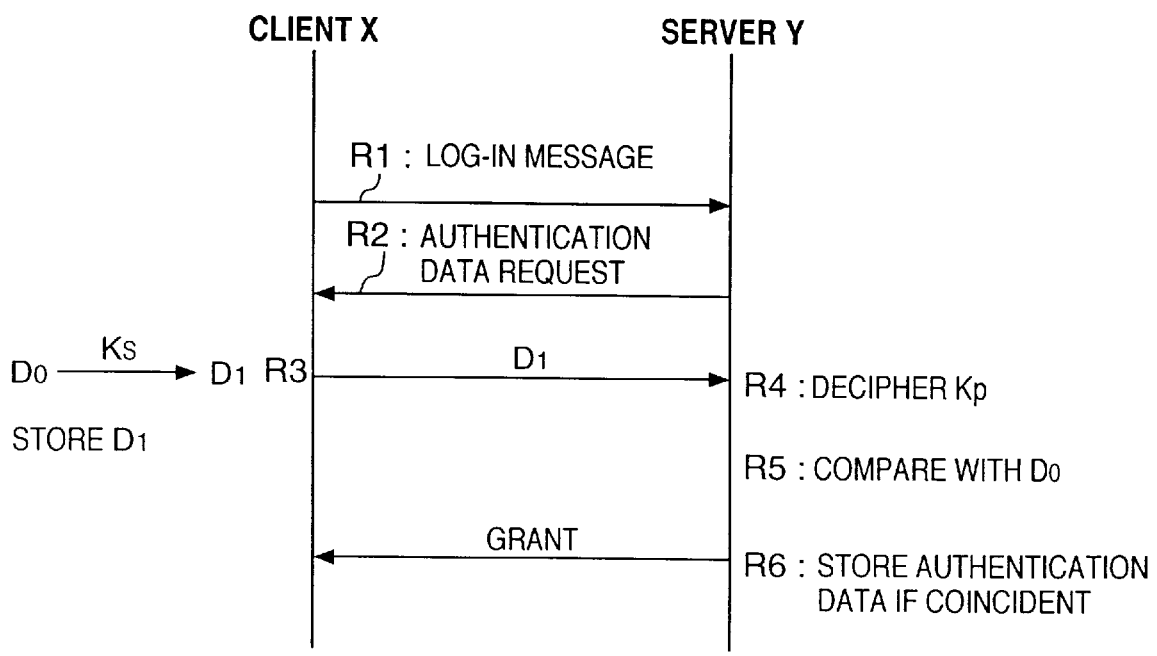
FIG. 14 is a table showing an authentication-data file stored in an authentication server according to an embodiment of the present invention.
FIG. 15 is an explanatory view explaining the authentication procedures according to an embodiment of the present invention.

FIG. 14 shows the authentication-data inspection data file possessed by the server Y. More specifically, the server Y has "authentication-data inspection data D", "public key $K_p$", "public-key certificate $CK_p$" for each client. In the example shown in FIG. 14, the server Y has inspection data $D_x$ and public key $K_{px}$ for the client X, and has inspection data $D_w$ and public key $K_{pw}$ for a client W.

FIG. 15 shows processing procedures respectively performed by the client X and server Y in order to realize authentication according to the present embodiment, and communication steps taken therebetween. Description will be provided below referring to FIGS. 13 and 15, on the procedures according to the present embodiment in a case where the client X requests to be authenticated to log-in the server.

Registration of Initial Data

In the present embodiment, a client needs to set initial seed data $D_{s0}$ and initially register it as initial inspection data $D_{s0}$ at the server Y before requesting to log-in. Because the registration only needs to be performed once, re-registration later is not necessary.

It is preferable that the registration operation be performed by a user of the client, while at the server side, performed by a system administrator who has the authority to set access privileges of clients. The initial seed data $D_{s0}$ may be anything: a random number, client's e-mail address, user's ID name and the like. As long as the secret key $K_s$ is kept in secret, the initial seed data $D_{s0}$ does not need to be kept in secret. Upon registration, the client is informed of the fact that registration is completed.

As will be described later, the seed data D is used by the client for generating authentication data. Once an authentication request using the authentication data is granted, the client stores the generated authentication data to be used as seed data for generating authentication data for requesting authentication at the next log-in. Meanwhile, the server collates the received authentication data with the inspection data D stored in advance, and if it is verified, the server stores the received authentication data to be used as inspection data at the next log-in request from the client. In the system according to the present embodiment, since a value of seed data stored in the authentication-data-generating seed data file 204 is coincident with a value of inspection data stored in the inspection data file 105 at the server side, the value is expressed as $D_{n-1}$ in FIG. 13, for the purpose of descriptive convenience. Herein, the seed data and inspection data are expressed by $D_{n-1}$ in general because the data is generated at the previous log-in.

In the example shown in FIG. 13, initial seed data of the client X is registered as $D_{s0}$.

According to the authentication protocol in the present embodiment, the client X generates authentication data based on the initial seed data $D_{s0}$ at the time of the initial authentication session. The protocol is characterized by the feature that, when authentication is granted, the previous-stored seed data $D_{n-1}$ is enciphered by the secret key $K_s$ of the client X and stored as seed data $D_n$ for the next authentication session. Note that although the previously used seed data $D_{n-1}$ will not be used in the subsequent log-in, it may be stored for historical purpose.

Hereinafter, the processing steps of the present embodiment will be described referring to FIGS. 13 and 15.

Step ①

The present embodiment authenticates whether or not a client who is about to log-in is the authentic client. Before the authentication processing, the client logs into the server first. Log-in according to the present embodiment is realized by sending a user identification name (user ID or the like) to the server Y. The log-in message may be a plain text message or enciphered message.

Step ②

The server Y who receives the log-in message sends an authentication-data request message to the client X.

Step ③

The client X who receives the authentication-data request message enciphers seed data D, which is stored by the client X, by using its own secret key $K_s$ to generate authentication data to be returned to the server Y, and sends the generated data to the server Y.

The example in FIG. 13 shows the case where the authentication session is started for the first time after the initialization registration. Thus, the seed data is $D_{s0}$. Therefore, the authentication data $D_1$, obtained by enciphering the seed data $D_{s0}$ with the secret key $K_s$ of the client X, is sent to the server Y.

Step ④

Upon receiving the authentication data $D_1$ from the client X, the server Y deciphers the received data using the already-obtained public key $K_p$ of the client X. As described above, according to the present embodiment, the authentication data $D_n$ is enciphered in accordance with the public-key enciphering algorithm. In other words, if authentication data $D_1$, supposedly indicating client X, is obtained by enciphering the authentic seed data $D_{s0}$ of the client X with the secret key $K_s$ of the client X, deciphered data obtained by deciphering the authentication data $D_1$ with the public key $K_p$ should coincide with the seed data $D_{s0}$ before being enciphered by the secret key $K_s$ of the client X.

Step ⑤

The server Y compares and collates the deciphered data $D_{s0}$ with the inspection data $D_{s0}$ of the client X read out of the client-authentication-data inspection data file 105.

Step ⑥

The server Y returns the collation result to the client X.

As described above, in a case where the collation result is coincident, the client X who has requested authentication is the authentic client. Therefore, the server Y returns a message indicative of log-in granted.

Furthermore, in preparation of the next log-in request from the client X, the enciphered authentication data $D_1$ received from the client X is stored in the client-authentication-data inspection data file 105. The server Y updates (writes) this authentication data only when the collation result in step ⑤ is coincident. The enciphered authentication data $D_1$, written in the inspection data file 105, is stored as inspection data for the next log-in.

Step ⑦

The client who received the authentication processing result from the server determines whether or not the authentication processing result is a grant or reject.

Step ⑧

In a case where the authentication is granted, the authentication data $D_1$ sent to the server is stored in the file 204 as seed data $D_1$ to be used at the next log-in.

In a case where the authentication is rejected (including the case where a processing result is not returned within a predetermined period of time), the authentication data $D_1$ cannot be used as the seed data $D_1$ for the next log-in; therefore, it is discarded. In other words, when retrying log-in, the client generates authentication data $D_1$ again from the seed data $D_{s0}$.

When a client first logs in, the above-described processing steps are taken for authenticating the log-in request.

Next time the client performs log-in, steps ① to ⑧ are repeated.

More specifically, as shown in FIG. 13, when the client X receives an authentication data request for the second time from the server Y, the client X enciphers the stored seed data $D_1$ by using the secret key $K_s$ to generate authentication data and sends the enciphered authentication data $D_2$ to the server Y. The server Y deciphers the received authentication data $D_2$ with the public key $K_p$, generating inspection data $D_1$, and compares the inspection data $D_1$ with the stored inspection data $D_1$. If they coincide as a result of comparison, log-in is granted, as similar to the first log-in.

Since authentication data which is effective only once can be generated infinitely according to this scheme, hereinafter this scheme will be referred to as "infinite one-time authentication scheme".

The advantage of the infinite one-time authentication scheme, which is to be emphasized as compared to the conventional scheme is the following.

(1) Authentication data generated at the next log-in can be generated only by the authentic requester who utilizes his secret key. Therefore, not only a third person but also the authentication data administrator at the server side cannot know the authentication data of the next log-in. Accordingly, it is possible to prevent unauthorized action by an insider with ill intention who "masquerades" as an authentic user, that is, internal crime.

More specifically, the authentication requester sends an authenticator the generation seed data (authentication data used at the time of previous log-in) which has been enciphered by his/her own secret key. The authenticator deciphers the authentication data received from the authentication requester by using the public key of the authentication requester. Log-in is granted only when the deciphered data coincides with inspection data which has been stored at the authenticator's side. Accordingly, as long as a client securely keeps his/her own secret key, a third person who has any (or all) of the authentication data, inspection data and authentication data generation seed data, is unable to "masquerade" as the authentic client.

Moreover, the authenticator compares the inspection data in one process of the authentication request processing, and until coincidence or non-coincidence of the inspection data is found, the authenticator does not exit from the processing. Once coincidence is found, the inspection data is immediately updated. Therefore, there is almost no time-lag to update the inspection data. Accordingly, there is almost no time for a third person to steal the authentication data and use the stolen data to masquerade as the authentication requester.

(2) Registering intial seed data is performed only once. Once the intial seed data is registered, a client can infinitely generate high-security authentication data.

(3) Authentication processing between the client and server does not include an interactive sequence, but is realized by transmitting only one message (authentication data) at the time of log-in. Therefore, programs necessary at the server side and client side are quite simple.

(4) There is almost no time-lag from the time at which the client sends authentication data to the server, to the time at which the authentication data is updated to the next authentication data (i.e. updating from $D_n$ to $D_{n+1}$). Therefore, even if authentication data is stolen during communication, there is no time for a third person who steals the data to use the stolen authentication data.

On the other hand, in the conventional scheme adopting time stamps as a part of the authentication processing, the server sets a permissible predetermined time period. Therefore, if the stolen authentication data is reused (replay attack) within the permissible time period, a third person can log-in by masquerading as the authentic client. However, in the scheme according to the present embodiment, this is impossible.

(5) At the server side, even if an insider such as a server administrator or the like steals the inspection data $D_n$ to try a false authentication, since this inspection data $D_n$ is compared with $D_{n-1}$ generated by being deciphered with the public key of the authentic requester, authentication will not succeed. Accordingly, even an insider of the server who is capable of knowing the inspection data cannot masquerade as a true authentication requester.

EMBODIMENT

Hereinafter, description will be provided on an embodiment of the above-described infinite one-time authentication scheme.

Figure 16:
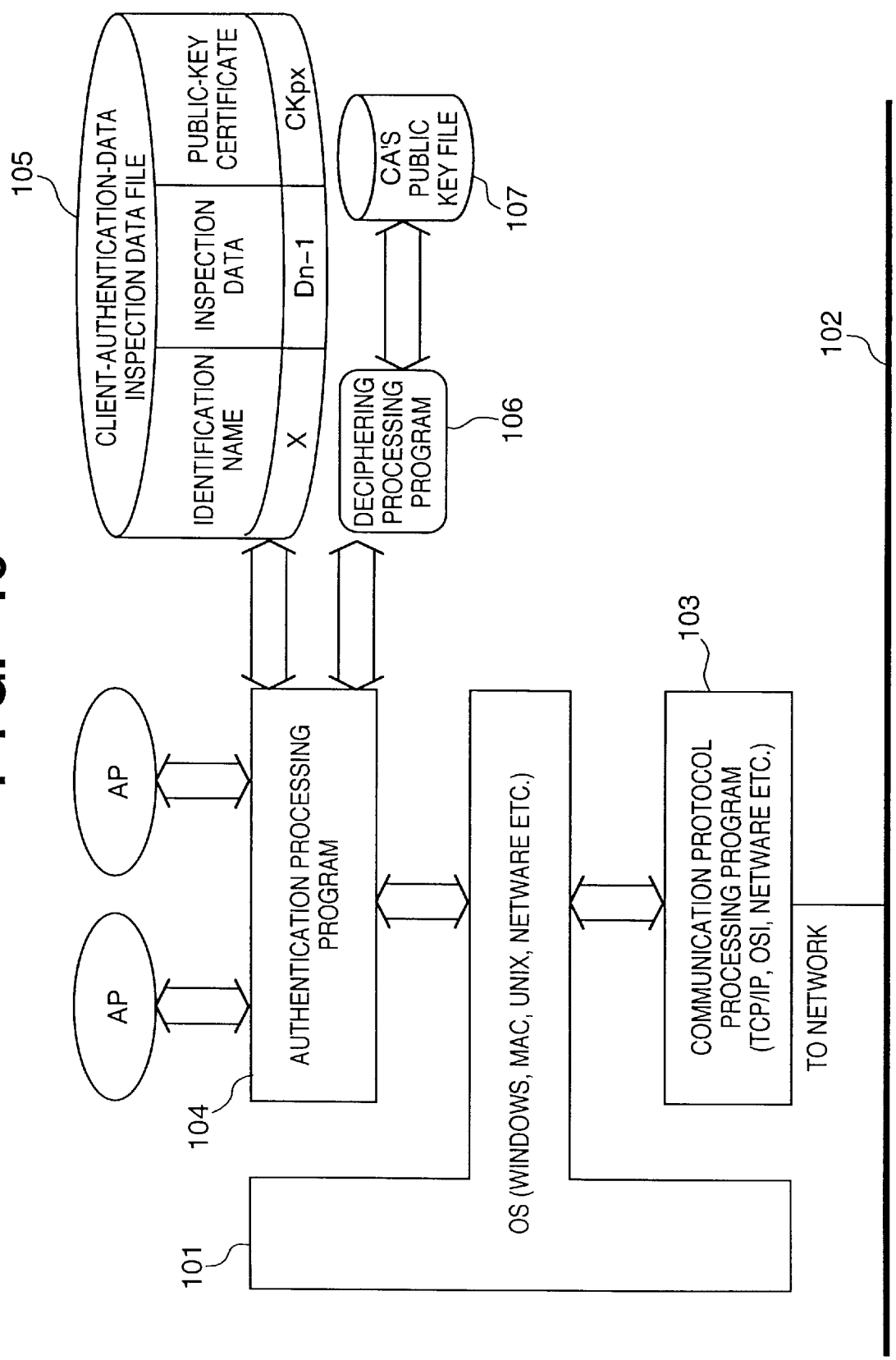
FIG. 16 is a block diagram showing the system construction of a server according to an embodiment of the present invention.

FIG. 16 shows the system construction of the server provided for the present embodiment.

The server utilizes, as an OS 101, for instance, WINDOWS, MAC OS, UNIX, or NETWARE. The communication protocol used in the network 102 is for instance, TCP/IP, OSI or NETWARE.

The client-authentication-data inspection data file 105 comprises a file having configuration similar to that explained with reference to FIG. 14. More concretely, the inspection data file 105 stores identification name data X, inspection data $D_{n-1}$ and public-key certificate $CK_{px}$. The public-key certificate $CK_{px}$ includes a version number, serial number, name of certificate-issue agency, expiration date of the certificate, user's identifier, user's public key and related data.

The public key file 107 stores a public key $K_{pc}$ of the certification authority CA. The public key $K_{pc}$ is used to inspect the digital signature added to the public-key certificate of the client X.

A deciphering processing program 106 obtains $K_{px}$ by inspecting the public-key certificate $CK_{px}$ of the client X, deciphers the received authentication data $D_n$ (enciphered by the client's secret key $K_s$) by using the public key $K_{px}$ and generate inspection data $D_{n-1}$.

Figure 17:
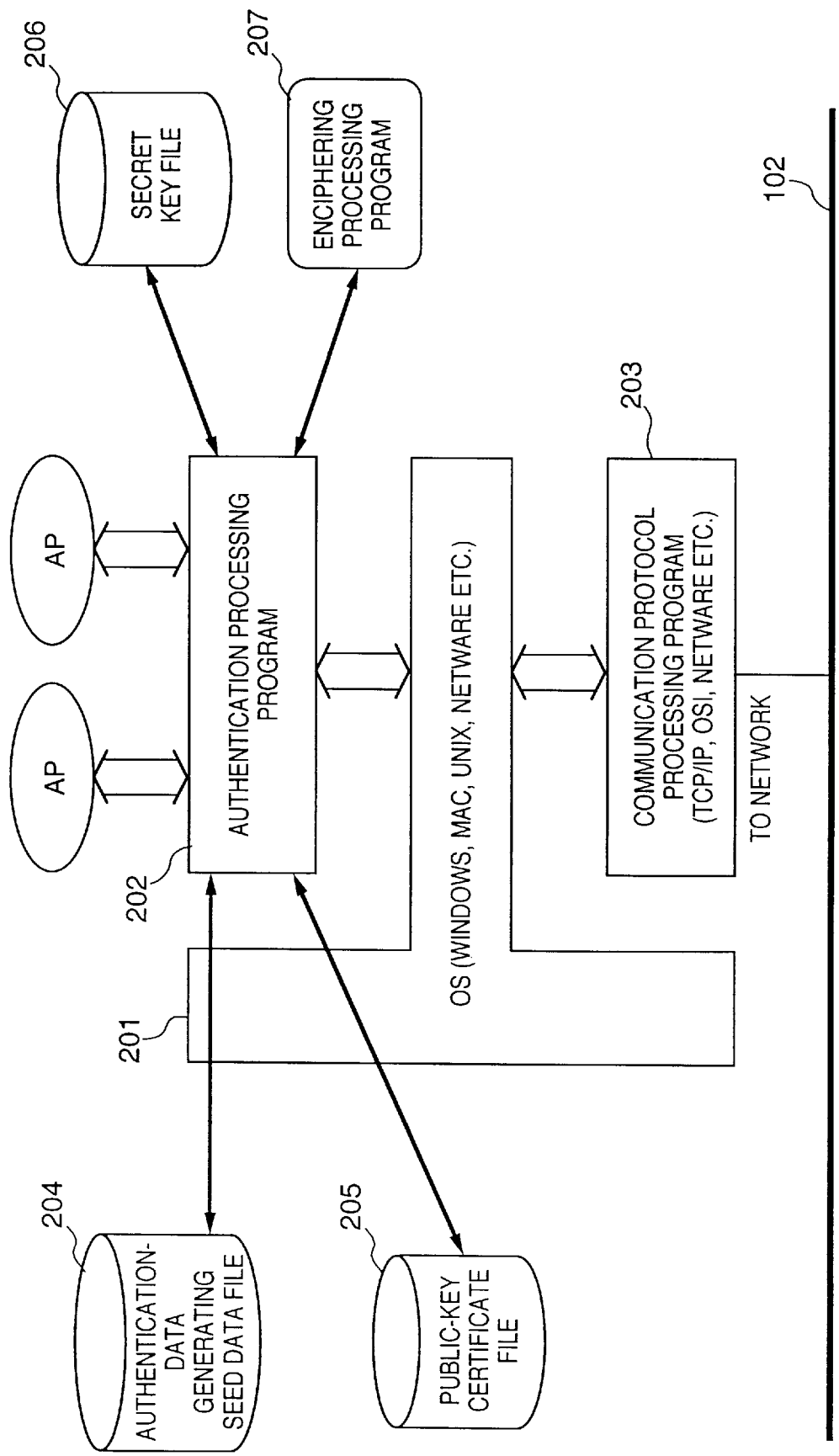
FIG. 17 is a block diagram showing the system construction of a client according to an embodiment of the present invention.

FIG. 17 is a structural view of a client. The client system utilizes, as an OS 201, for instance, WINDOWS, MAC OS, UNIX, or NETWARE. The communication protocol used is for instance, TCP/IP, OSI or NETWARE. In this case, the communication protocol at the client side needs to be coincident with the communication protocol at the server side. However, the client's OS does not need to be coincident with the server's OS. A secret key file 206 stores a secret key $K_s$ of the client X. It is preferable that the secret key $K_s$ is enciphered according to a predetermined enciphering steps.

The enciphering and deciphering the secret key $K_s$, as well as enciphering the authentication data seed data $D_{n-1}$ into authentication data $D_n$ using the secret key $K_s$ are performed in accordance with an enciphering processing program 207 under the support of an authentication processing program 202.

The authentication-data-generatingseed data file 204 stores seed data for generating authentication data of the client X.

An authentication processing program 104 at the server side executes the control steps written in the right side of FIG. 15 and the authentication processing program 202 at the client side executes the control steps written in the left side of FIG. 15.

The system shown in FIG. 17 is characterized in that the secret key $K_s$ is enciphered and stored on the local disk of the client's system. The infinite one-time authentication scheme according to the present embodiment shown in FIG. 13 requires a precondition such that the client X securely keeps his/her secret key $K_s$. The client system in FIG. 17 achieves this precondition by enciphering the secret key $K_s$.

The enciphering processing program 207 may employ various techniques. For instance, a simple and convenient technique is to require a password for a user who uses the system in FIG. 17. However, it is preferable to utilize an appropriate common-key enciphering scheme such as DES to encipher the secret key $K_s$ by using a pass phrase as a key which is known only to the client X and store it. As a result, the key $K_s$ cannot be discovered by a third person, making the third person impossible to masquerade as the client X. In addition, advantages such as followings are attained: the key $K_s$ can be securely kept by simply installing enciphering software which does not require a special device; and an external interface device is unnecessary.

Particularly, by providing a plug-in program module as the enciphering processing program 207, operability, extensibility and variability largely improve.

Various forms are available to send the client's public key $K_p$ to the server.

In the example shown in FIG. 16, it is a precondition that the server obtains a public-key certificate of the client X at each log-in. In other words, the client sends the server, for instance, the public-key certificate $CK_{px}$ of the client X along with the authentication data.

When the authentication processing program 104 at the server side receives a log-in message of a client X, the program 104 returns an authentication data request message to the client. When the program 104 receives authentication data transmitted by the client X in response to the message, the program 104 inspects a digital signature of the certification authority (CA), which is added to the public-key certificate of the client X, by utilizing a public key $K_{pc}$ (stored in the file 107) of the CA. If the inspection result shows that the digital signature is authentic, the program 104 verifies that the public-key certificate is the authentic public-key certificate of the client X. The public-key certificate $CK_{px}$ of the client X is stored in the inspection data file 105. The deciphering processing program 106 accesses the inspection data file 105 and derives the public key $K_{px}$ of the client X included in the public-key certificate $CK_{px}$.

MODIFICATION

Various modifications can be made according to the present invention without departing from the scope of its spirit.

Fist Modified Example

For instance, in the example shown in FIG. 16, the public-key certificate of the client is transmitted from the client to the server at each log-in. However, according to the method in the first modified example, since there is no need to keep the public key of the client in secret, the client X does not need to send the public-key certificate at each log-in.

In the first modified example, in a case where the programs at the server side include a log-in from the client X in the log-in process, a step of inspecting whether or not the inspection data file 105 stores the public-key certificate $CK_{px}$ of the client X is added. If the server receives a log-in request from a client whose public-key certificate is not registered in the file, the server may send a public-key certificate request message before sending an authentication data request message to the client.

Second Modified Example

The above-described embodiment is inconvenient in the point that a client (user) X can only use a client terminal storing the secret key $K_s$ for log-in. Therefore, in the second modified example, the secret key $K_s$ is stored in an IC card instead of the client terminal, enabling the client X to carry around the IC card.

Figure 18:
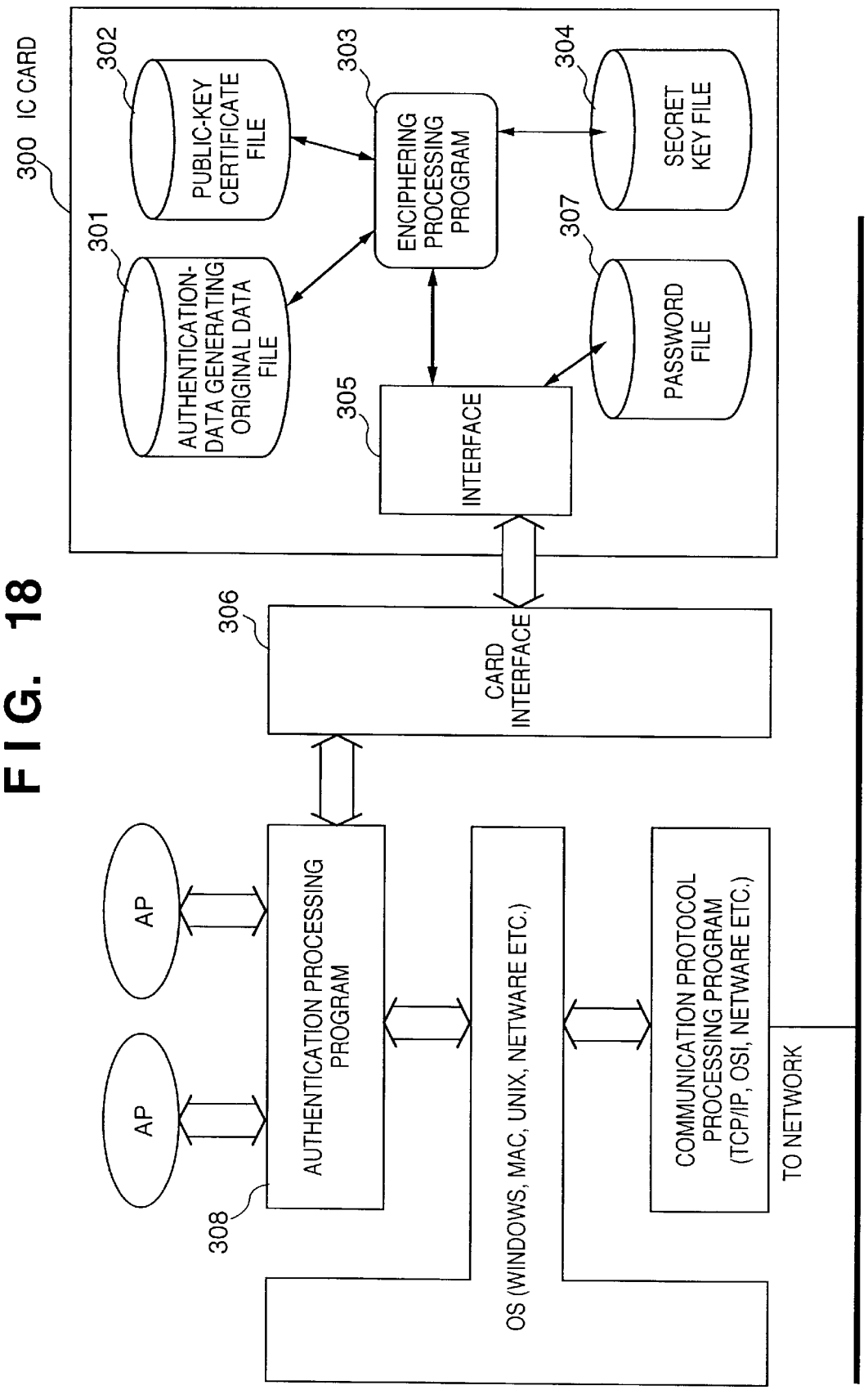
FIG. 18 is a block diagram showing the system construction of a client according to a modified example of the present invention.

The configuration of the system serving as the client in this case is shown in FIG. 18. The system shown in FIG. 18 is characterized by the IC card 300 which includes a password file 307 storing a user's password, a file 302 storing a public-key certificate, a file 304 storing the secret key $K_s$, and particularly, the enciphering processing program 303.

When the system shown in FIG. 18 is adopted as the client's configuration, the server can employ the configuration shown in FIG. 16.

FIG. 19 is an explanatory view showing cooperative operation of an authentication processing program 308 (client-host side) and enciphering processing program 303 (client-card side) in the client shown in FIG. 18.

First, when a user makes a log-in request (e.g. an IC card is read by a card reader which is not shown), the enciphering processing program 303 sends an authentication data request message (message requesting a password) to the client via the authentication processing program 308 of the terminal. If the user is an authentic user, a correct password is inputted from a keyboard (not shown) of the terminal. When the password is inputted, the program 308 sends the inputted password to the enciphering processing program 303 via interface. The enciphering processing program 303 compares the received password with a password stored in the password file 307.

If the passwords do not coincide, the message indicating non-coincidence is returned to the authentication processing program 308, which then rejects the log-in request.

Meanwhile, if the passwords coincide, the enciphering processing program 303 at the card side issues permission to use the IC card to the user, and also informs the authentication server that the authentication request has been granted.

Next, the client performs authentication request to the authentication server. The subsequent steps are the same as those steps described with reference to FIG. 13. In this case, it is important that the enciphering processing program 303 in the IC card 300 performs all the enciphering processing using the secret key $K_s$ for generating authentication data from the seed data $D_{n-1}$. In other words, no data related to the secret key $K_s$ is sent to the host side. The only data sent to the host side is the authentication data $D_n$. As described above, even if a third person obtains the authentication data Dn, the third person is unable to reuse the authentication data.

Note that the system at the client side shown in FIG. 18, it is not preferred that the secret key file 304 is opened to the authentication processing program 308 (there is a risk of data leakage or tampering). Since a large number of unspecified users may use the client's host system, it is not preferable to expose the secret key $K_s$ in the raw form to the host system. Therefore, it is preferable to encipher the secret key $K_s$ in the secret key file 304 in accordance with an enciphering algorithm such as DES or the like using a password in the password file 307. If the secret key $K_s$ is enciphered, even if a secret key $K_s$ is read out of the file 304 by e.g., tampering the authentication processing program in the host, there is a very little risk of being deciphered because the secret key is enciphered by DES.

According to this modified example, since the secret key $K_s$ is stored in the IC card, it is impossible for a third person to masquerade as a client X by using the client terminal. More specifically, the system at the client side may be a general-purpose personal computer, and the personal computer may be used by persons other than the client X. In addition, any terminal can be used as the client's main apparatus as long as the terminal is capable of interfacing with an IC card. Accordingly, for instance, remote log-in or the like using a portable terminal is enabled from outside.

Furthermore, since the IC card adopts a scheme of authenticating the client X (user) by a code number or the like before executing log-in processing, even if a user loses the IC card, it is difficult for a third person to use the IC card by masquerading as the client X.

Third Modified Example

Note that in the above-described embodiments and modified examples, the public key of the client X is either stored by the server in advance or derived from the client. However, as mentioned above, the public key of the client once transmitted by the client may be stored by the server, and the stored public key may be used at the subsequent log-in together with the public-key certificate. This is because it would not be a problem for others to know the public key. However, since an expiration date is set for the certificate (thus, public key also), if a log-in request is sent after the expiration date, it is preferable that the server requests the client to resend a public-key certificate in accordance with the above-described technique.

Fourth Modified Example

In addition, in the above-described embodiments and modified examples, the existence of network is a precondition. However, the present invention does not require the existence of network. If authentication is necessary, for instance, the present invention may be applied to a host computer and an input/output apparatus.

Fifth Modified Example

Although the above-described embodiments have discussed problems of authentication occurred at the time of transferring data via a communication line (either wired or wireless), the present invention can be applied to a door lock (open and close) apparatus utilizing a card. In this case, the lock function serves as an authentication server.

As has been described above, according to the present invention, it is possible to provide the high-quality authentication method, authentication apparatus and authentication server utilizing a simple-step authentication scheme.

More specifically, since the inspection data and seed data are changed every time, the present invention has an improved resistance to the replay attack. Even if authentication data is stolen during transmission, there is almost no time for a third person to use the stolen data; therefore, security is maintained. Furthermore, even if the seed data, authentication data or inspection data are stolen, it is quite difficult for a third person to use the stolen data as long as the client keeps the secret key.

The present invention is not limited to the above embodiments and various changes and modifications can be made within the spirit and scope of the present invention. Therefore, to appraise the public of the scope of the present invention, the following claims are made.

What is claimed is:

1. An authentication method for authenticating an authentication requester by using a public-key enciphering scheme in response to an authentication request sent by the authentication requester, comprising:

a storing step of storing first inspection data into an authenticator's memory in advance for inspecting authentication data of the authentication requester;

an authentication request sending step of sending an authentication request from the authentication requester to the authenticator;

an authentication-data requesting step of sending an authentication-data request from the authenticator to the authentication requester in response to the authentication request sent by the authentication requester;

an authentication-data sending step of sending from the authentication requester to the authenticator, in response to the authentication-data request, first authentication information which is generated by enciphering first seed data held by the authentication requester with utilizing a secret key of the authentication requester, and storing the generated first authentication data as second seed data for a next authentication request in place of the stored first seed data;

a comparing step of deciphering the first authentication data, sent by the authentication requester, by utilizing a public key of the authentication requester, generating second inspection data, and comparing the second inspection data with the first inspection data stored in advance; and an updating step of notifying the authentication requester of grant of the authentication request in a case where the second inspection data coincides with the first inspection data, and storing the first authentication data in place of the first inspection data in the memory.

2. An authentication server storing authentication data for granting authentication in response to an authentication request sent by a plurality of authentication requesters, comprising:

a memory storing inspection data for inspecting authentication data of an authentication requester for each authentication request;

sending means for sending an authentication-data request message to an arbitrary authentication requester when the server receives an authentication request from the arbitrary authentication requester;

comparing means for generating new inspection data by deciphering authentication data sent by the authentication requester by utilizing a public key of the authentication requester, and comparing the newly generated inspection data with the inspection data stored in said memory; and grant means for granting the authentication request in a case where the newly generated inspection data coincides with the stored inspection data, and storing the authentication data sent by the authentication requester in place of the stored inspection data.

3. An authentication apparatus for granting authentication, in response to an authentication request sent by an authentication requester, in support of an external authentication server, comprising:

a memory storing seed data from which authentication data is generated for authentication of the authentication requester;

sending/receiving means for sending an authentication request message to the authentication server, and receiving an authentication-data request message from the authentication server responding to the authentication request message;

enciphering means for enciphering, in response to the authentication-data request message sent by the authentication server, the seed data stored in said memory by utilizing a secret key to generate authentication data; and authentication-data sending means for sending the generated authentication data to the authentication server, and storing the generated authentication data in said memory in place of the stored seed data.

4. An authentication terminal apparatus for granting authentication to an authentication request sent by an authentication requester via a storage medium, in support of an external authentication server, comprising:

a main body; and interface means for accepting a storage medium storing:
seed data used for generating authentication data to authenticate an authentication requester,
a secret key of the authentication requester and
a program for generating authentication data based on the seed data utilizing the secret key, and said main body comprising:
receiving means for receiving an authentication request from the authentication requester;
requesting means for sending an authentication request message to the authentication server in response to the authentication request, and receiving an authentication-data request message from the authentication server responding to the authentication request;
instructing means for executing the program stored in the storage medium via said interface means in response to the authentication-data request message, said instructing means instructing the program to generate authentication data of the authentication requester based on the seed data by using the secret key, instructing the program to return the generated authentication data to the main body via said interface means, and instructing the program to update the seed data stored in the storage medium with the generated authentication data; and
authentication-data sending means for sending the returned authentication data to the authentication server.

5. A storage medium storing an authentication program for granting authentication to an authentication request sent by an authentication requester, in support of an external authentication server, said authentication program comprising:

first program code means for storing seed data in a memory for generating authentication data to authenticate the authentication requester;

second program code means for sending an authentication request message to the authentication server;

third program code means for receiving the authentication request message from the authentication server;

fourth program code means for generating authentication data based on the seed data stored in the memory by utilizing a secret key in response to the authentication data request message; and fifth program code means for sending the generated authentication data to the authentication server and storing the generated authentication data as new seed data in place of the old seed data.

6. The authentication method according to claim 1, wherein in said authentication-data sending step, the first seed data is replaced with the second seed data in a case where the authentication requester receives a notification of grant of the authentication request, while in a case where the authentication requester does not receive the notification, the first seed data is not replaced.

7. The authentication apparatus according to claim 3, said authentication-data sending means updates the seed data in a case where a notification of grant of the authentication request is received from the authentication server, while in a case where the notification is not received, said authentication-data sending means does not perform updating.

8. The authentication terminal apparatus according to claim 4, wherein said instructing means instructs the program stored in the storage medium to update the seed data in a case where a notification of grant of the authentication request is received from the authentication server, while in a case where the notification is not received, said instructing means instructs the program not to update the seed data.

9. The storage medium according to claim 5, wherein said fifth program code means includes sixth program code means for updating the seed data in a case where a notification of grant of the authentication request is received from the authentication server, while in a case where the notification is not received, not updating the seed data.

10. The authentication method according to claim 1, wherein identification data of the authentication requester is used as an initial value of the first seed data.

11. The authentication apparatus according to claim 3, wherein identification data of the authentication requester is used as an initial value of the seed data.

12. The authentication terminal apparatus according to claim 4, wherein identification data of the authentication requester is used as an initial value of the seed data.

13. The authentication method according to claim 1, wherein in said authentication-data sending step, authentication data is sent to the authentication server together with a public-key certificate.

14. The authentication apparatus according to claim 3, wherein said authentication-data sending means sends authentication data to the authentication server together with a public-key certificate.

15. The authentication terminal apparatus according to claim 4, wherein said authentication-data sending means sends authentication data to the authentication server together with a public-key certificate.

16. The authentication server according to claim 2, wherein said memory stores a public key of each authentication requester together with inspection data.

17. The authentication method according to claim 13, wherein the authenticator stores the sent public-key certificate.

18. The authentication method according to claim 1, wherein in a case where the first inspection data is not coincident with the second inspection data, the authentication request sent by the authentication requester is rejected.

19. The authentication server according to claim 2, wherein in a case where the newly generated inspection data is not coincident with the stored inspection data, the authentication request sent by the authentication requester is rejected.

20. The authentication method according to claim 1, wherein the secret key of the authentication requester is enciphered such that only an authentic owner can decipher.

21. The authentication terminal apparatus according to claim 4, wherein the storage medium is an IC card.

22. The authentication terminal apparatus according to claim 4, wherein the storage medium further stores a password, compares a password inputted by the authentication requester with the password stored in the storage medium, and only when the passwords are coincident, returns the authentication data to the main body.

23. The authentication terminal apparatus according to claim 4, wherein the generation of the authentication data based on the seed data by using the secret key is performed only within the storage medium so that the secret key is not sent to the main body.

* * * * *

UNITED STATES PATENT AND TRADEMARK OFFICE
CERTIFICATE OF CORRECTION

PATENT NO. : 6,148,404
DATED : November 14, 2000
INVENTOR(S) : N. Yatsukawa

It is certified that error appears in the above-identified patent and that said Letters Patent is hereby corrected as shown below:

Title page,
Insert the following:

OTHER PUBLICATIONS

"Internet Security ," Larry J. Hughes Jr., Translated by Koki Nagahara, February 21, 1997, pp. 80-86 (with copy of original English article pp. 77-82).

Column 8,
Line 32, "$(X = Y')^2$" is changed to -- $X = \underline{Y'^2}$ --
Line 40, "$2_{-k}$" is changed to -- $2^{-k}$ --

Column 21,
Line 42, "Dn" is changed to -- $D_n$ --

Signed and Sealed this

Thirtieth Day of October, 2001

Attest:

NICHOLAS P. GODICI
*Attesting Officer*      *Acting Director of the United States Patent and Trademark Office*